(12) United States Patent
Dittmer et al.

(10) Patent No.: US 8,837,127 B2
(45) Date of Patent: Sep. 16, 2014

(54) WALL-AVOIDING SELF-BALANCING MOUNT FOR TILT POSITIONING OF A FLAT PANEL ELECTRONIC DISPLAY

(71) Applicant: Milestone AV Technologies LLC, Eden Prairie, MN (US)

(72) Inventors: Jay Dittmer, Prior Lake, MN (US); Mathew Schuh, Shakopee, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 13/966,051

(22) Filed: Aug. 13, 2013

(65) Prior Publication Data

US 2014/0042283 A1 Feb. 13, 2014

Related U.S. Application Data

(63) Continuation of application No. 12/518,593, filed as application No. PCT/US2008/000117 on Jan. 4, 2008, now Pat. No. 8,508,918.

(60) Provisional application No. 60/883,656, filed on Jan. 5, 2007, provisional application No. 60/957,941, filed on Aug. 24, 2007.

(51) Int. Cl.
| | |
|---|---|
| *H05K 5/00* | (2006.01) |
| *H05K 7/00* | (2006.01) |
| *A47F 5/00* | (2006.01) |
| *A47F 7/00* | (2006.01) |
| *F16M 11/00* | (2006.01) |
| *F16M 13/00* | (2006.01) |
| *E04G 3/00* | (2006.01) |
| *F16M 11/20* | (2006.01) |
| *F16M 11/10* | (2006.01) |
| *F16M 13/02* | (2006.01) |
| *F16M 11/38* | (2006.01) |
| *H04N 5/64* | (2006.01) |

(52) U.S. Cl.
CPC ....... *F16M 13/022* (2013.01); *F16M 2200/061* (2013.01); *H04N 5/64* (2013.01); *F16M 11/2014* (2013.01); *F16M 11/10* (2013.01); *F16M 11/38* (2013.01); *F16M 13/02* (2013.01)
USPC ................. 361/679.01; 248/274.1; 248/125.7

(58) Field of Classification Search
USPC ............ 361/679.01, 679.04, 679.05, 679.06; 248/125.7, 274.1, 917, 919, 920, 922, 248/923
See application file for complete search history.

(56) References Cited

U.S. PATENT DOCUMENTS

| | | | | |
|---|---|---|---|---|
| 5,743,503 | A * | 4/1998 | Voeller et al. .............. | 248/284.1 |
| 6,905,101 | B1 * | 6/2005 | Dittmer ..................... | 248/274.1 |
| 7,380,760 | B2 * | 6/2008 | Dittmer ..................... | 248/278.1 |
| 7,438,269 | B2 * | 10/2008 | Pfister et al. ............. | 248/292.14 |
| 7,753,332 | B2 * | 7/2010 | O'Keene ................... | 248/292.14 |
| 7,784,758 | B2 * | 8/2010 | Oh et al. ................... | 248/274.1 |
| 8,235,342 | B2 * | 8/2012 | Pfister et al. ............. | 248/292.14 |
| 8,561,955 | B2 * | 10/2013 | Stemple .................... | 248/278.1 |

\* cited by examiner

*Primary Examiner* — Anthony Haughton

(74) *Attorney, Agent, or Firm* — Patterson Thuente Pedersen, P.A.

(57) ABSTRACT

A device for mounting an electronic display to a wall includes a support structure operably connected to a tilt head assembly and a display interface structure. The support structure includes an arm assembly that can be extended and rotated so that the electronic display avoids contacting the wall. The tilt head assembly includes an attachment member, guide structures for tilting the electronic display so that the electronic display remains self-balancing, and a plate for positioning the guide structures. The display interface structure facilitates attachment of the attachment member to the electronic display.

20 Claims, 44 Drawing Sheets

WALL-AVOIDING SELF-BALANCING MOUNT FOR TILT POSITIONING OF A FLAT PANEL ELECTRONIC DISPLAY

RELATED APPLICATIONS

The present application is a continuation of application Ser. No. 12/518,593, filed Aug. 28, 2009, now U.S. Pat. No. 8,508,918, issued Aug. 13, 2013, which is a U.S. National Stage Application based on PCT/US2008/000117, filed Jan. 4, 2008, which in turn claims the benefit of U.S. Provisional Application No. 60/883,656, entitled WALL AVOIDING MOUNT FOR FLAT PANEL ELECTRONIC DISPLAY, filed Jan. 5, 2007, and U.S. Provisional Application No. 60/957,941, entitled WALL-AVOIDING SELF-BALANCING MOUNT FOR TILT POSITIONING OF AN ELECTRONIC DISPLAY, filed Aug. 24, 2007, each of said applications being hereby fully incorporated herein by reference in their entirety.

FIELD OF THE INVENTION

The present invention relates to flat panel display devices, and more specifically to mounting devices for flat panel electronic display devices.

BACKGROUND OF THE INVENTION

An attribute of modern flat-panel electronic displays that makes them highly desirable to consumers is the aesthetic appeal of a very flat device that has the appearance of a framed photo or painting when hung from a wall. This same attribute is also desirable in that floor and interior space taken up by the display is minimal.

With current flat panel display technology, however, best viewing quality is typically achieved when the screen is viewed at as near as possible to a ninety degree angle from the plane of the screen. Liquid crystal displays will often appear perceptibly darker at the more oblique angles. In other cases, particularly with plasma displays, glare from the screen surface may impair viewing. Consequently, it is desirable to have the ability to selectively position the display to enable best viewing quality.

Numerous wall mounting devices for flat panel displays have been developed so as to enable tilt and/or swing positioning of the display. Examples of such mounting devices are disclosed, for example, in U.S. Pat. Nos. 6,905,101, 7,028,961, and 7,152,836, all of which are owned by the owner of the present invention and are hereby fully incorporated herein by reference.

A drawback of these previous mount designs is that the edges of the display may sometimes collide with the wall surface during positioning. These collisions may leave unsightly marks or gouges in the wall surface, or may cause damage to the display itself. Hence, there is still a need for a flat panel display mount that enables selective positioning of the display while alleviating the undesirable effects of wall collisions.

SUMMARY OF THE INVENTION

The present invention addresses the need in the industry for an electronic display mount that enables selectively positioning of the electronic display, while alleviating the undesirable effects of wall collisions. Device and methods according to the present invention generally include a support structure operably connected to a display interface structure and a tilt head assembly. The display interface structure is attached to the electronic display. The support structure includes an extendable arm assembly, a pivot column, and a swingstop post. The support structure can be used to rotatably position the electronic device about a substantially vertical axis. The tilt head assembly includes an attachment member, a positionable plate, and guide structures. The tilt head assembly can be used to rotatably position the electronic display about a substantially horizontal axis.

According to an embodiment of the present invention, the extendable arm is selectively positionable to a plurality of positions. The pivot column defines the substantially vertical axis about which the support structure can be rotated. The swingstop post defines a plurality of ranges of rotation of the extendable arm assembly about the substantially vertical axis. Each position of the extendable arm assembly corresponds to a range of rotation.

According to another embodiment of the present invention, the first and second guide structures define a path of rotation of the electronic display about the substantially horizontal axis. The electronic display is substantially self-balancing at any point along the path of rotation.

According to another embodiment of the present invention, the plate is positionable in a plurality of positions. Each position defines a different location of the substantially horizontal axis.

According to another embodiment of the present invention, a system comprises an electronic display device and a support structure operably connected to a display interface structure and a tilt head assembly. The display interface structure is attached to the electronic display. The support structure includes an extendable arm assembly, a pivot column, and a swingstop post and can be used to rotatably position the electronic device about a substantially vertical axis. The tilt head assembly includes an attachment member, a positionable plate, and guide structures. The tilt head assembly can be used to rotatably position the electronic display about a substantially horizontal axis.

According to another embodiment of the present invention, a method provides for positioning an electronic display mounted to a substantially vertically oriented surface with a mounting device. The mounting device includes a support structure operably connected to a display interface structure and a tilt head assembly. The method comprises extending the support structure to a first extended position, rotating the electronic display about a substantially vertical axis within a range of rotation defined by the first extended position, positioning the tilt head assembly, and rotating the electronic display about a substantially horizontal axis to a first tilted position. The electronic display is self-balancing in the first tilted position.

BRIEF DESCRIPTION OF THE DRAWINGS

The embodiments of the present invention may be more completely understood in consideration of the following detailed description of various embodiments in connection with the accompanying drawings, in which.

Figure 1:
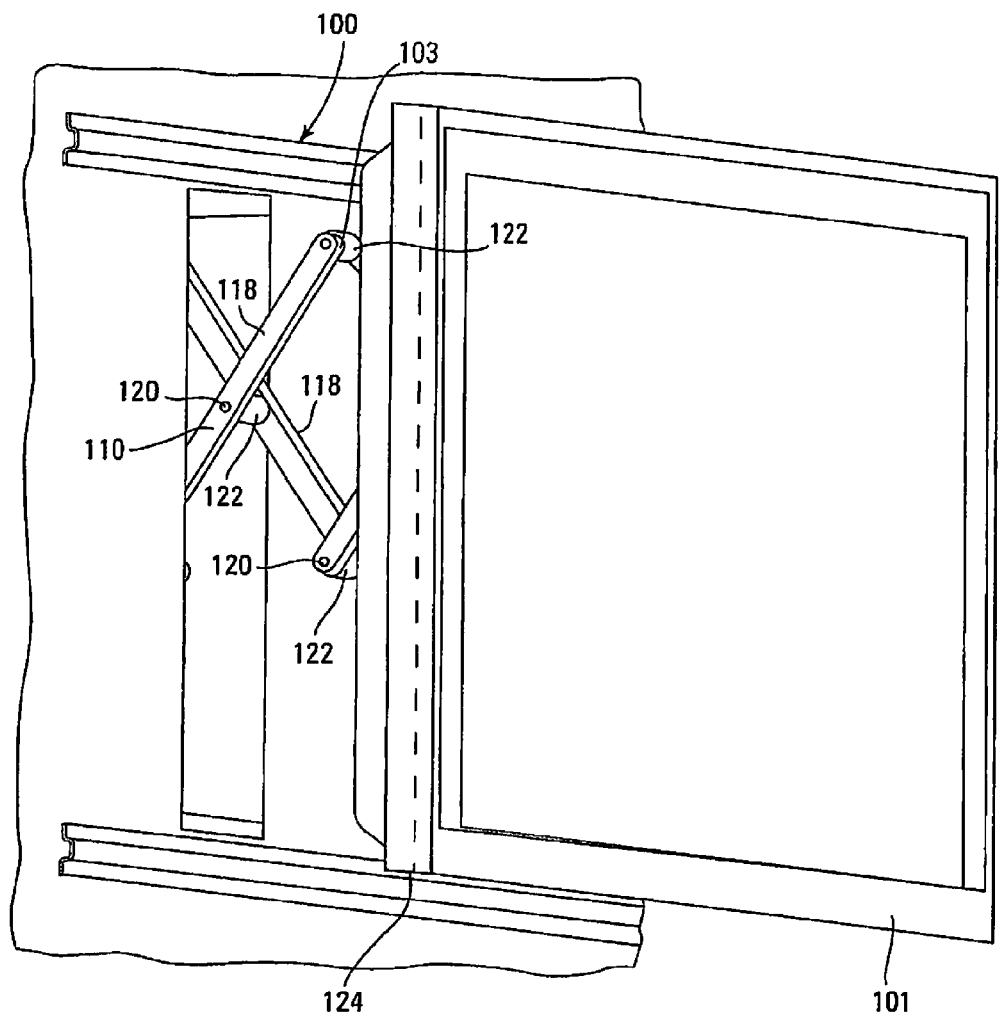
FIG. 1 is a front perspective view of a flat panel electronic display and mount according to an embodiment of the invention.
Figure 2:
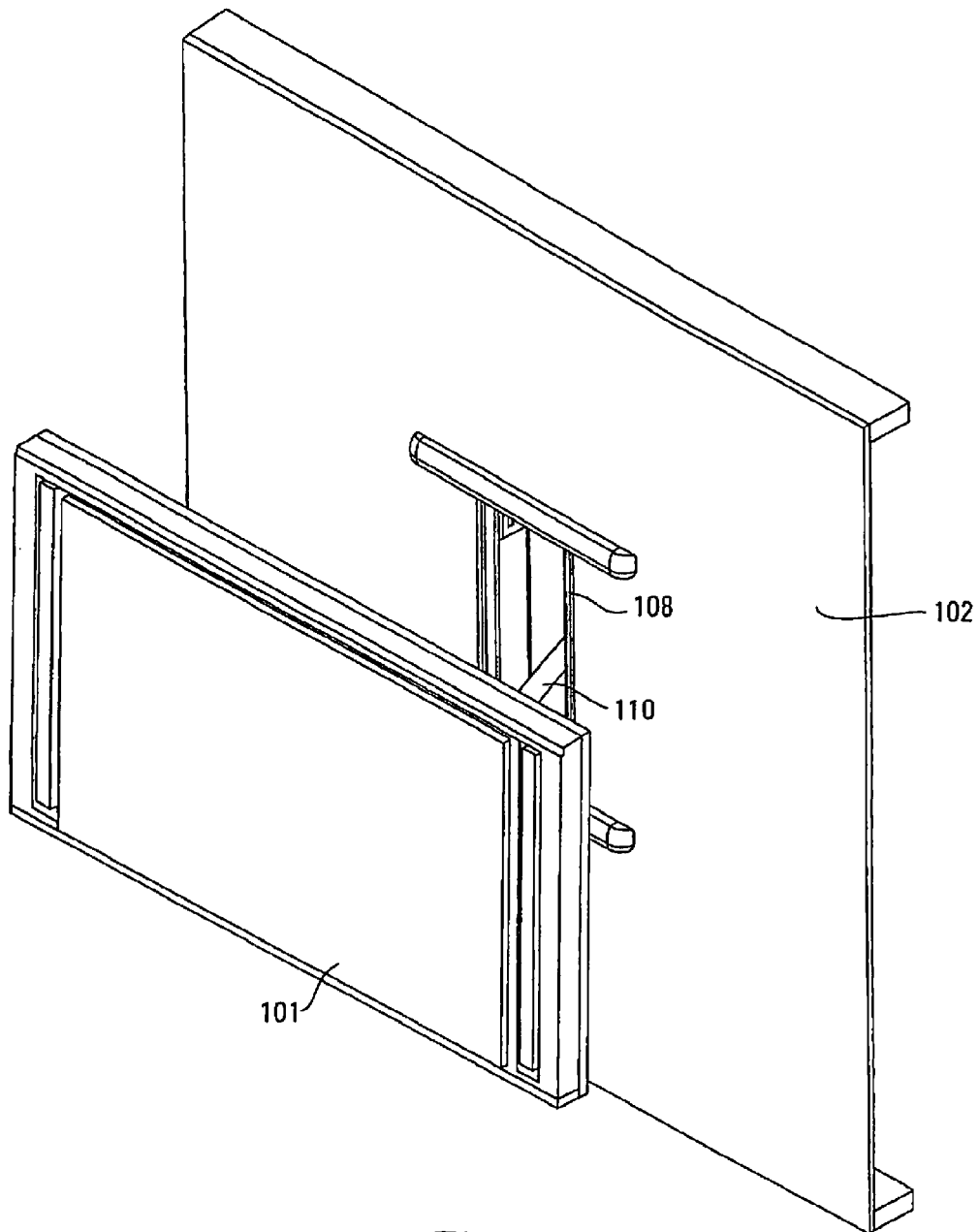
FIG. 2 is a perspective view of a mount according to an embodiment of the invention coupled with a wall assembly and with a flat panel electronic display mounted thereon and shifted away from the wall assembly.
Figure 3:
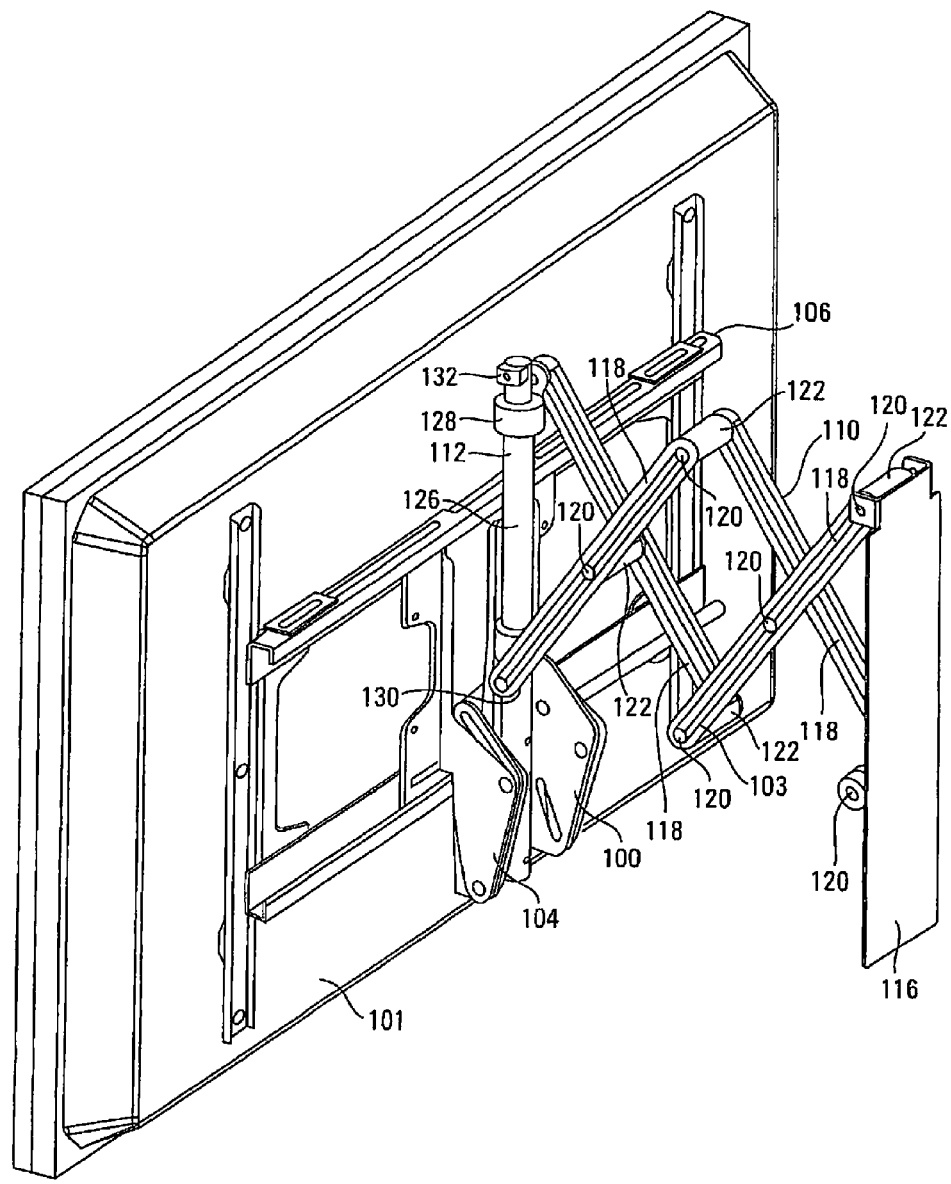
FIG. 3 is a rear perspective view of the display and mount of FIG. 1.
Figure 4:
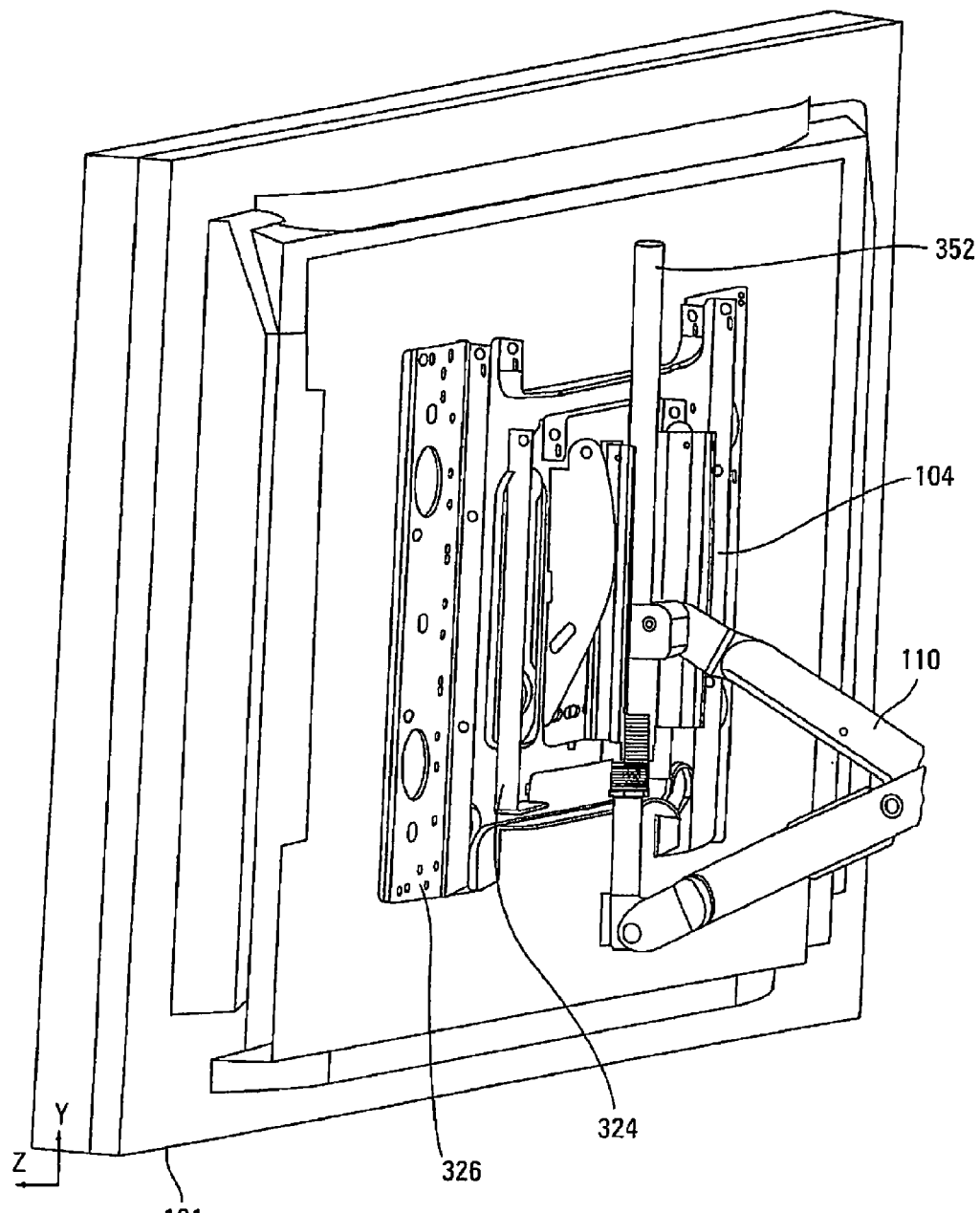
FIG. 4 is a rear perspective view of a mount according to an embodiment of the invention coupled with an electronic display.
Figure 5:
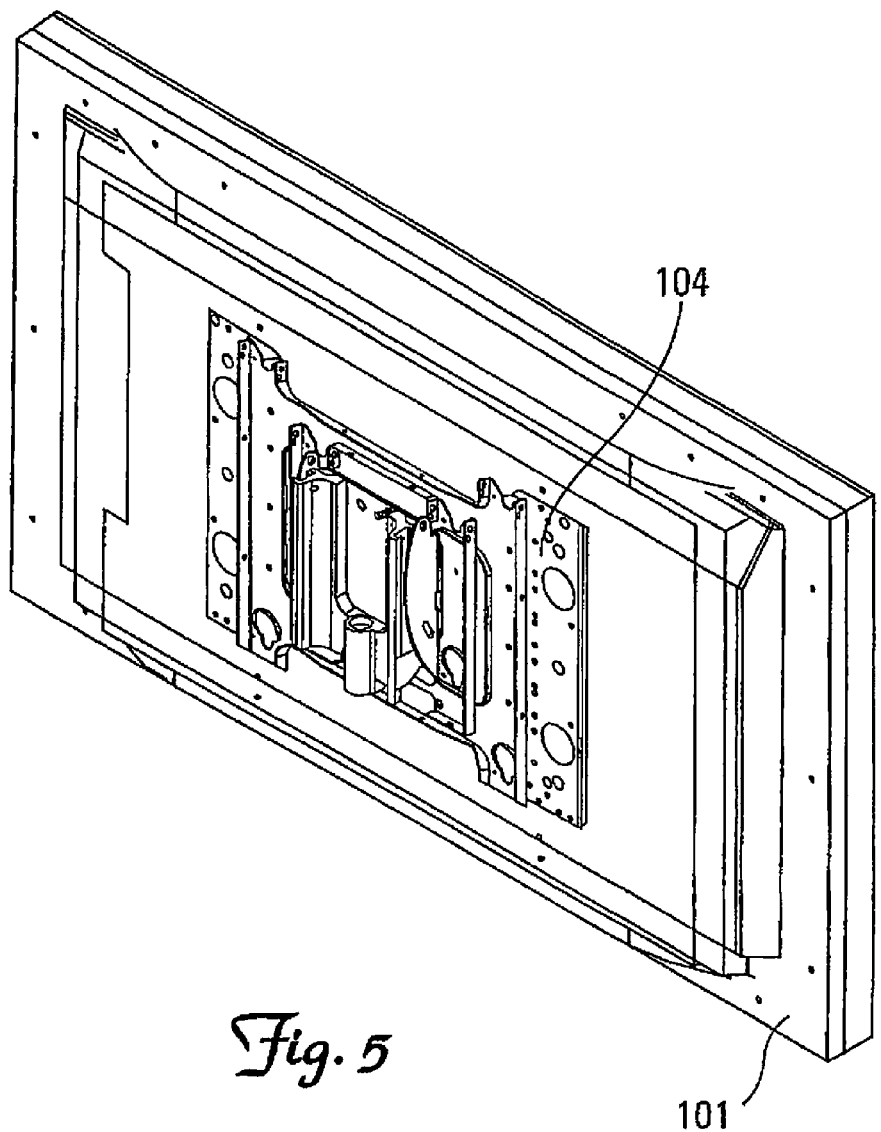
FIG. 5 is another rear perspective view of a mount according to an embodiment of the invention coupled with an electronic display.
Figure 6:
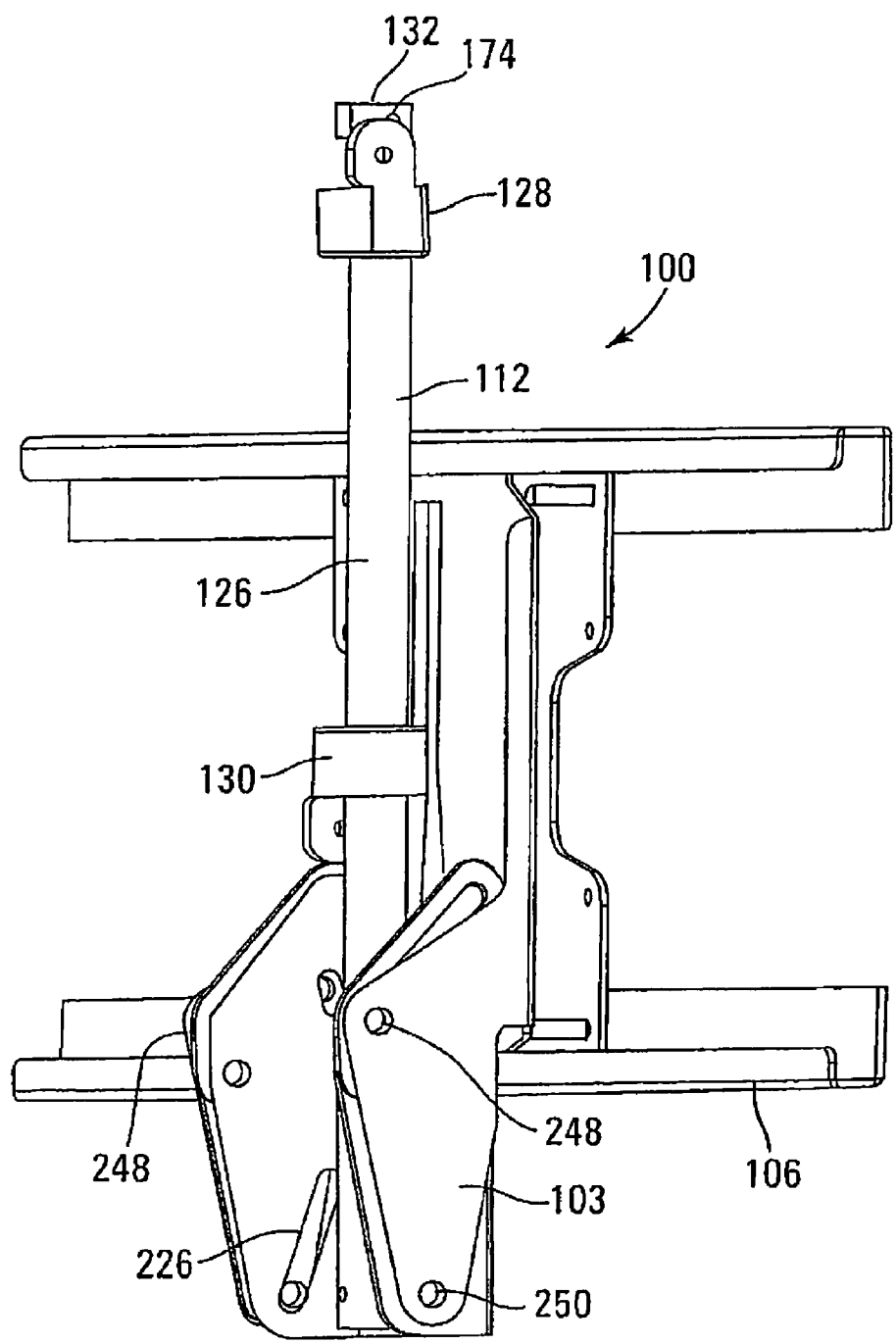
FIG. 6 is a fragmentary rear perspective view of a portion of the mount of FIG. 3 depicted without the extendable arm assembly and display for clarity.
Figure 7:
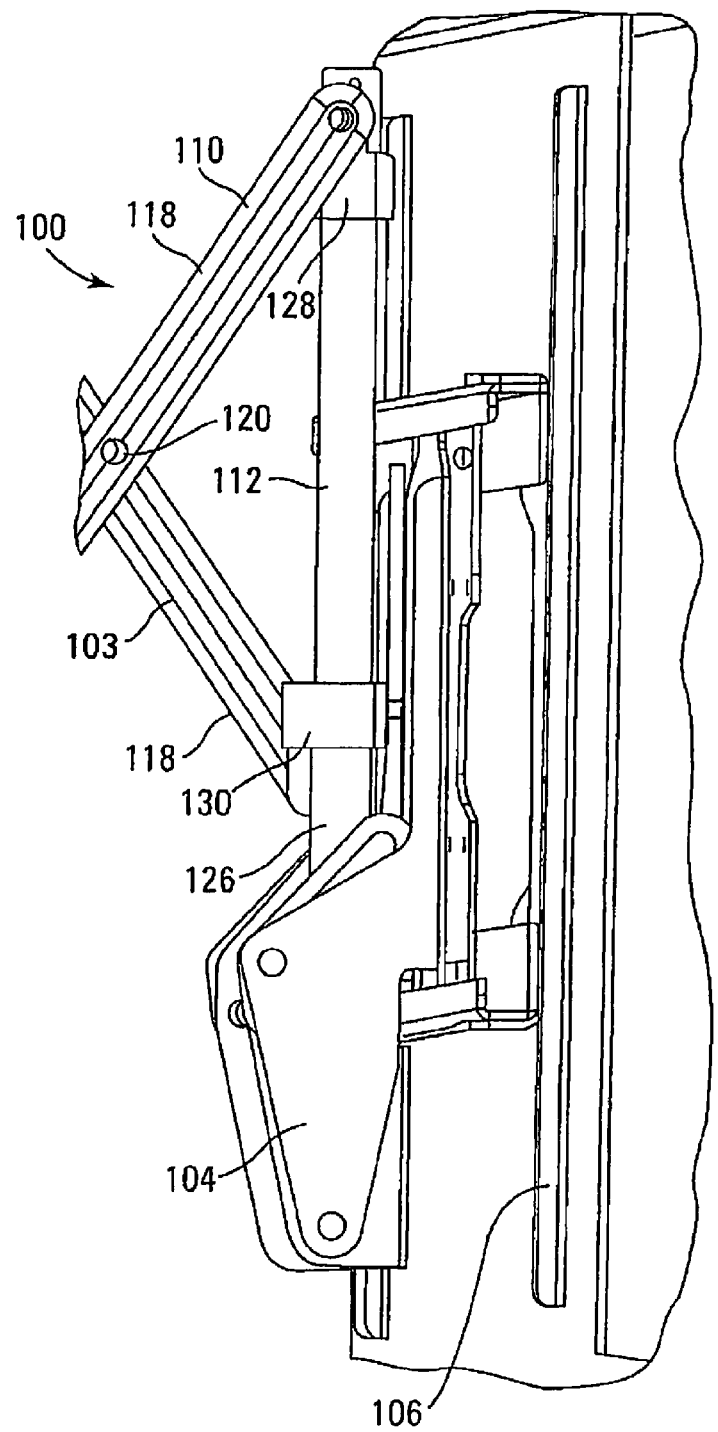
FIG. 7 is a fragmentary rear perspective view of the display and mount of FIG. 3.
Figure 8:
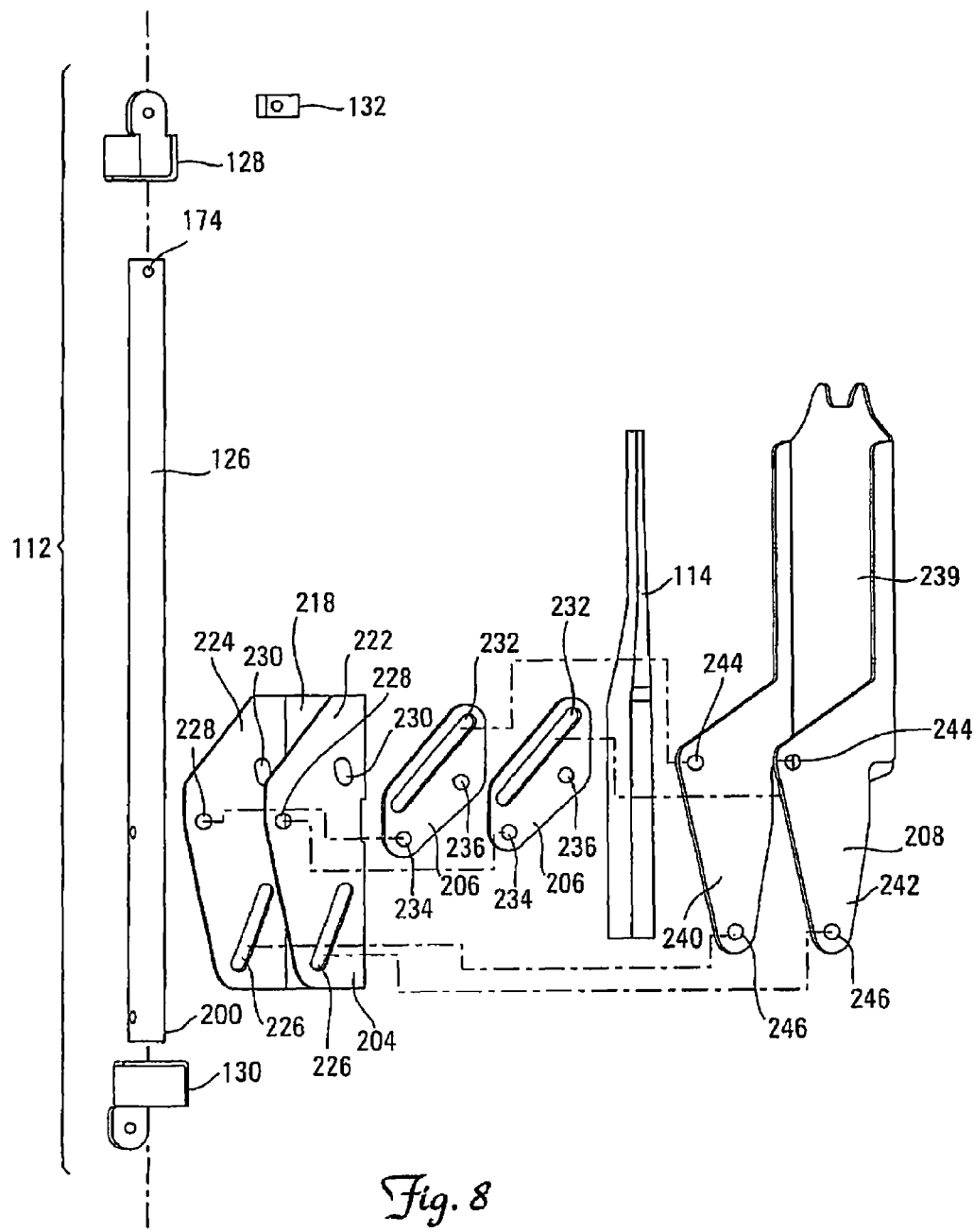
FIG. 8 is an exploded view of the tilt head and support column assemblies of a mount according to an embodiment of the invention.
Figure 9:
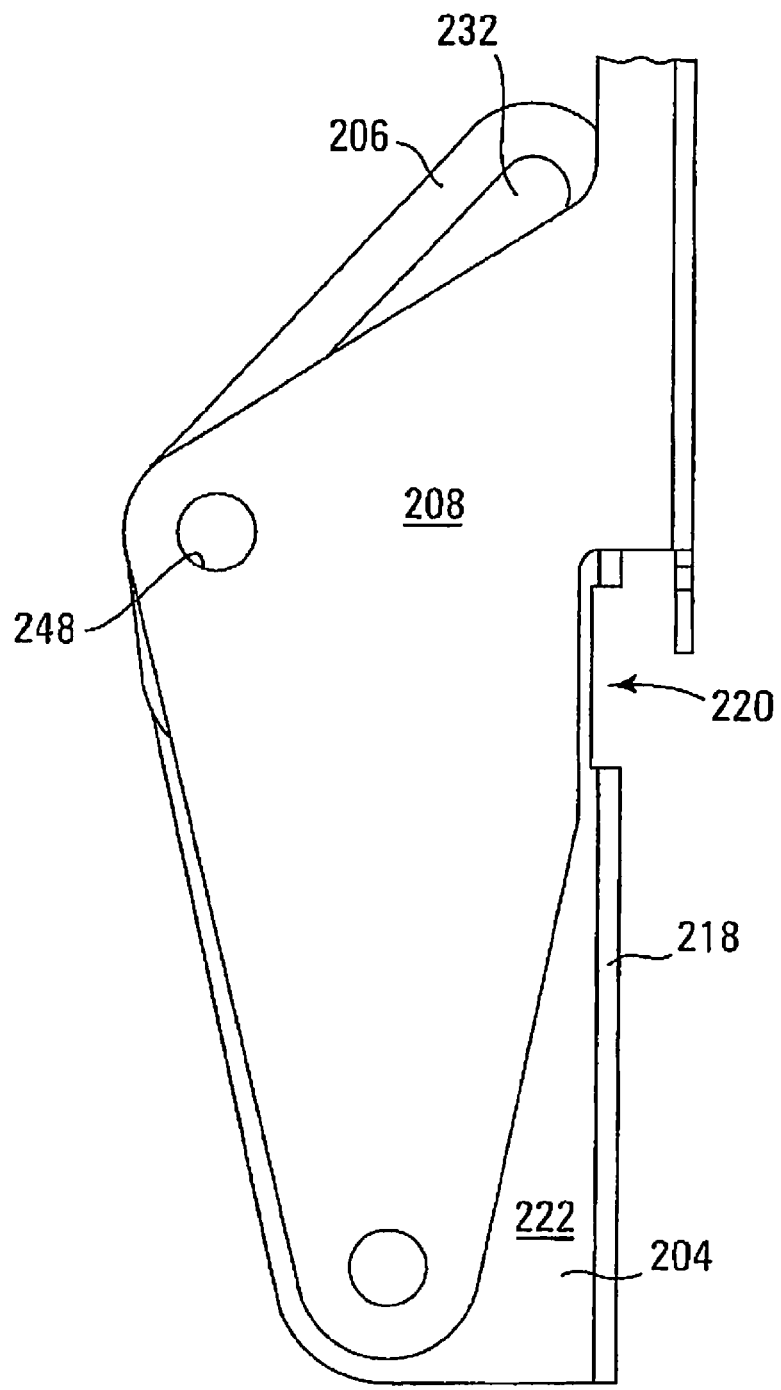
FIG. 9 is a fragmentary side elevation view of the tilt head portion of a mount according to an embodiment of the invention.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE PREFERRED EMBODIMENTS

Referring to FIGS. 1-5, a wall-avoiding mount is generally depicted with reference numeral 100. Mount 100 can be used to mount flat panel display 101 to wall 102. Generally, mount 100 includes support structure 103, tilt head 104, and display interface structure 106. Mount may also include in-wall box 108.

Figure 14:
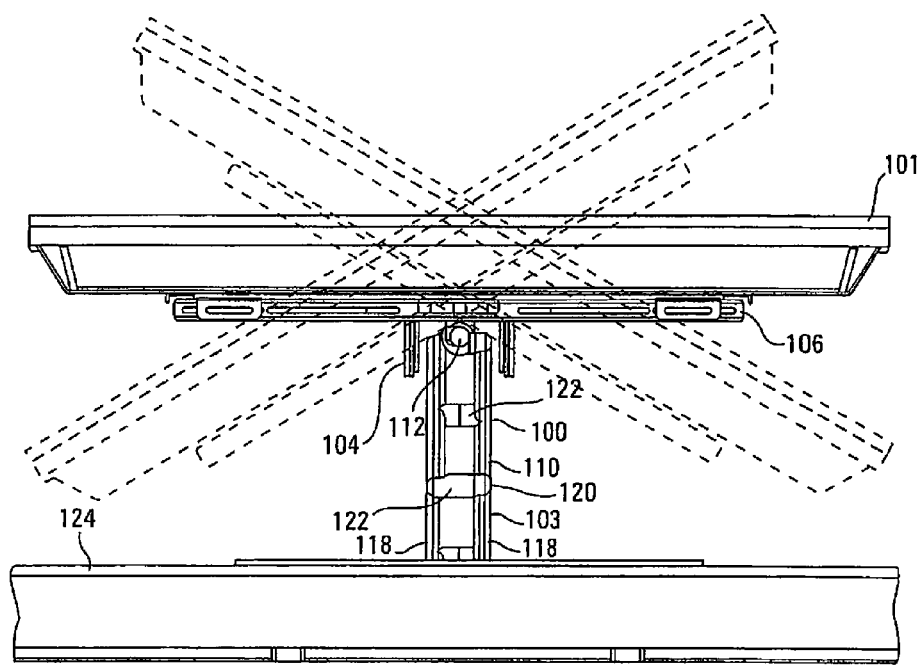
FIG. 14 is a top plan view of a display and mount according to an embodiment of the invention depicting the swing motion of the display in a first position relatively spaced apart from a wall surface.
Figure 15:
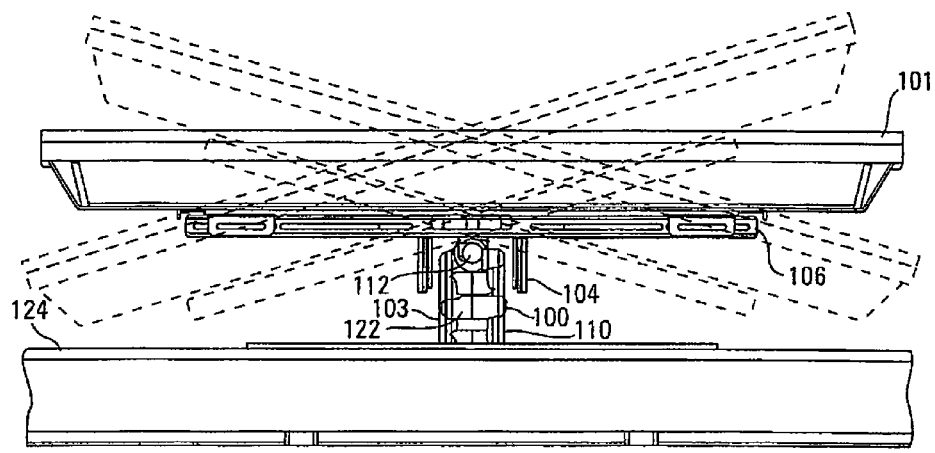
FIG. 15 is a top plan view of a display and mount according to an embodiment of the invention depicting the swing motion of the display in a second position relatively more proximate a wall surface.

Support structure 103 generally includes extendable arm assembly 110, support column assembly 112, and swing limit cam 114. Extendable arm assembly 110 generally includes wall interface 116 and arms 118, pivotally coupled together at pivots 120. Lateral spacers 122 may be provided at pivots 120 to provide lateral spacing between adjacent arms 118 in order to avoid pinch points and shearing action as extendable arm assembly 110 is extended and retracted. As depicted in FIGS. 14-15, extendable arm assembly 110 enables display 101 to be selectively positioned at any desired distance outward from wall surface 124.

It will be readily appreciated that extendable arm assembly 110 may include virtually any desired number of arms 118 so as to enable a desired range of movement outward from wall surface 124. Further, consistent with other aspects of embodiments of the invention disclosed herein, support structure 103 may include or consist of any other structure providing support for tilt head 104, such as swing arm arrangements or fixed mounting brackets. Moreover, support structure 103 may be attached directly to wall surface 124, or may be advantageously used with in-wall attachment arrangements such as disclosed for example in the U.S. Provisional Application No. 60/883,652 CENTERING IN-WALL MOUNT filed by the owners of the present invention on Jan. 5, 2007, the complete disclosure of which is hereby fully incorporated herein by reference.

Figure 19:
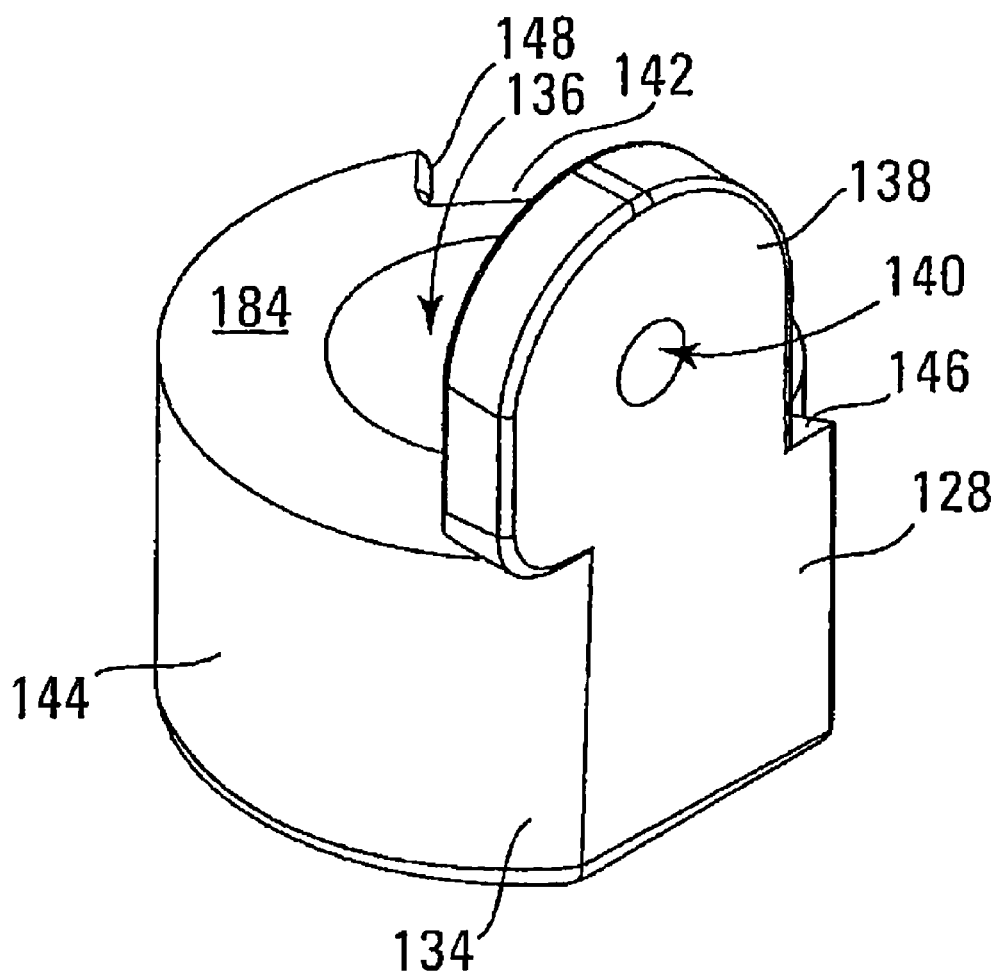
FIG. 19 is a top perspective view of an upper pivot bushing of a mount according to an embodiment of the invention.
Figure 20:
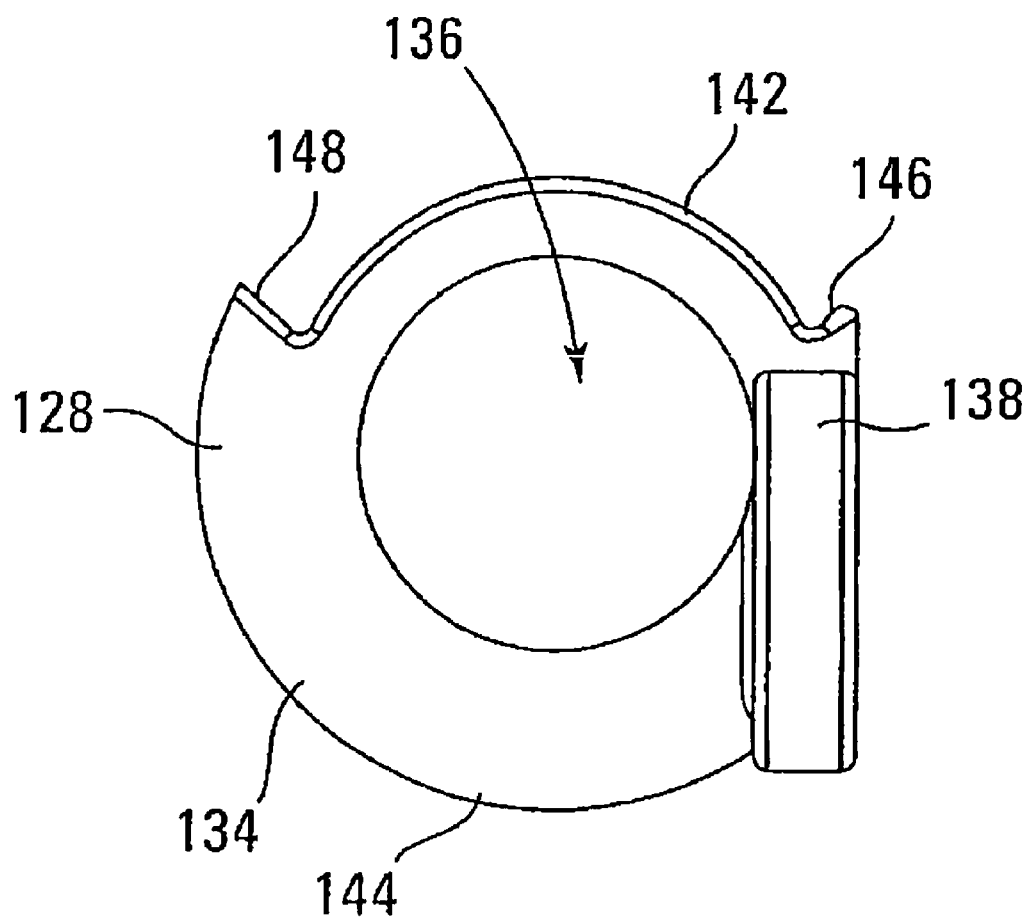
FIG. 20 is a top plan view of the bushing of FIG. 19.
Figure 21:
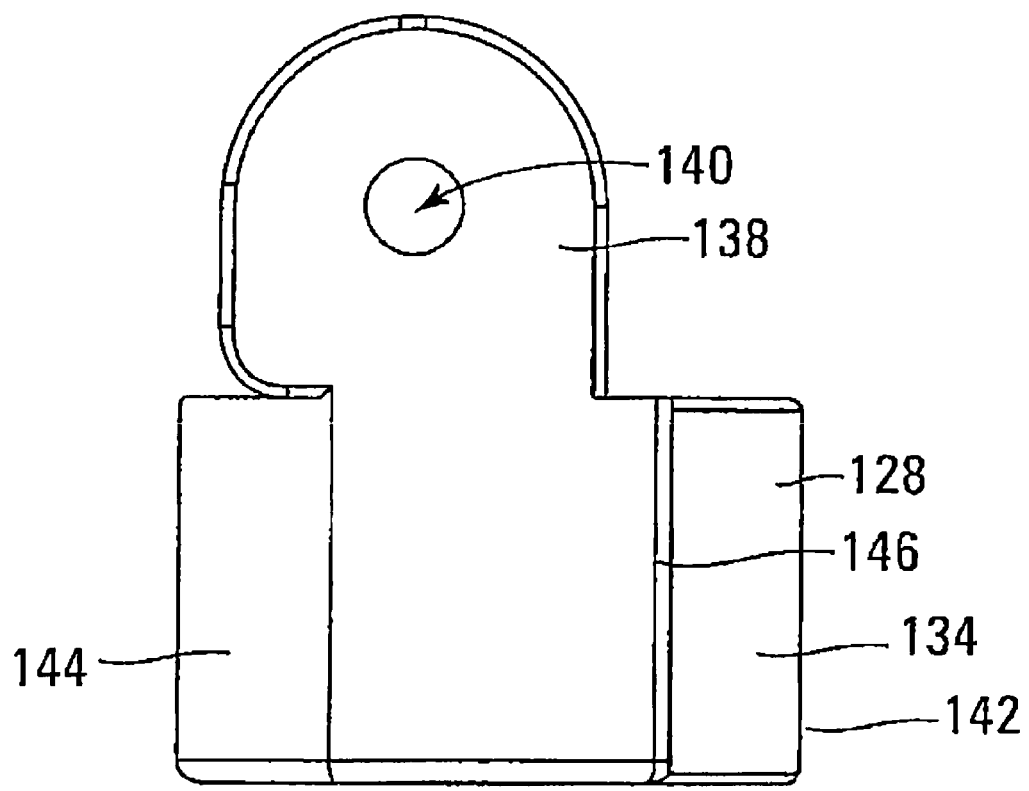
FIG. 21 is a side elevation view of the bushing of FIG. 19.
Figure 22:
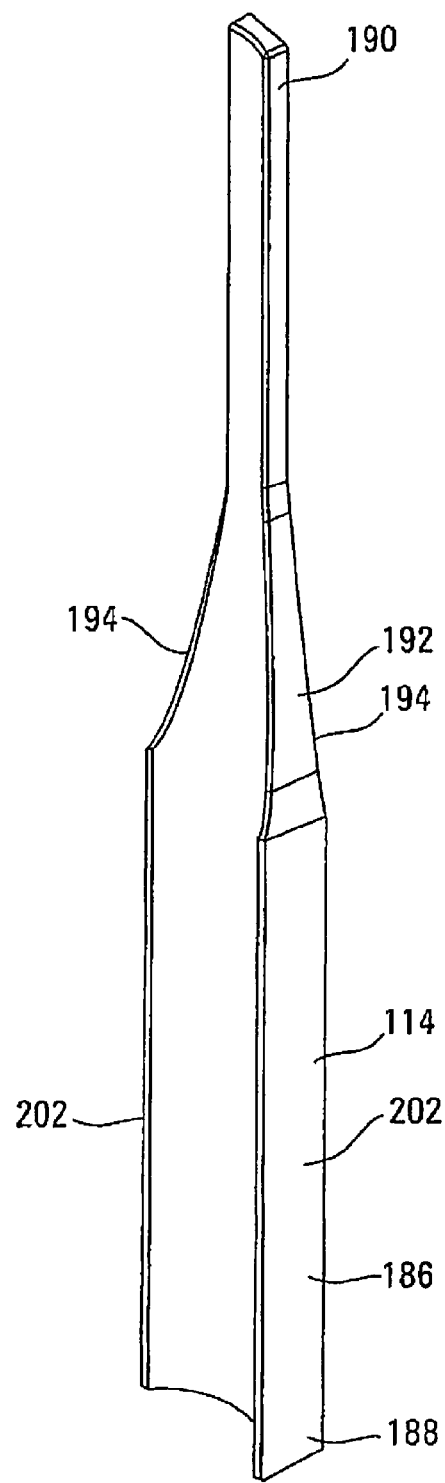
FIG. 22 is a front perspective view of the swing limit cam of a mount according to an embodiment of the invention.
Figure 23:
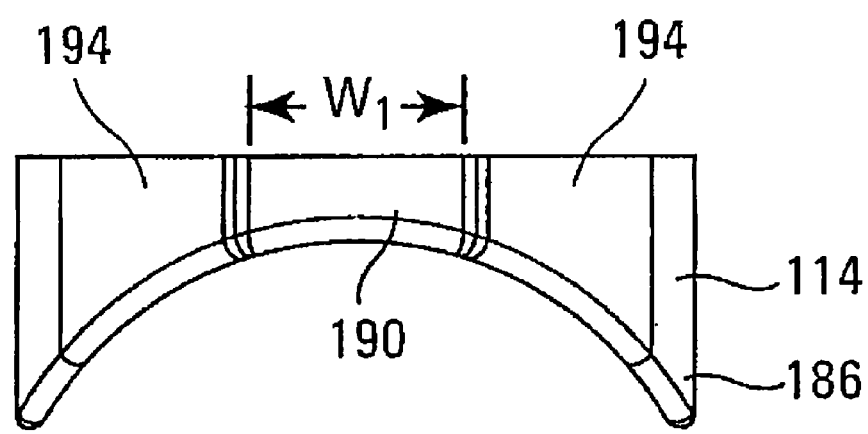
FIG. 23 is a top plan view of the cam of FIG. 22.
Figure 24:
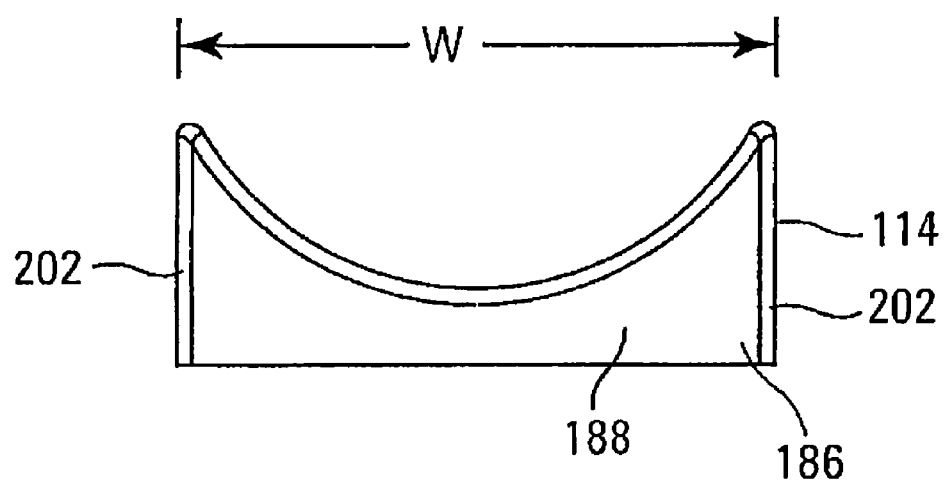
FIG. 24 is a bottom plan view of the cam of FIG. 22.

Support column assembly 112 generally includes tubular vertical column 126, upper pivot bushing 128, lower pivot bushing 130 and lift adjuster assembly 132. Upper pivot bushing 128, as depicted in FIGS. 19-21, generally includes body portion 134 defining central bore 136. Tab 138 extends from body portion 134 and defines pivot aperture 140. Body portion 134 is generally cylindrical with front edge 142 having a smaller radius than rear edge 144, defining a pair of shoulders 146, 148.

Figure 16:
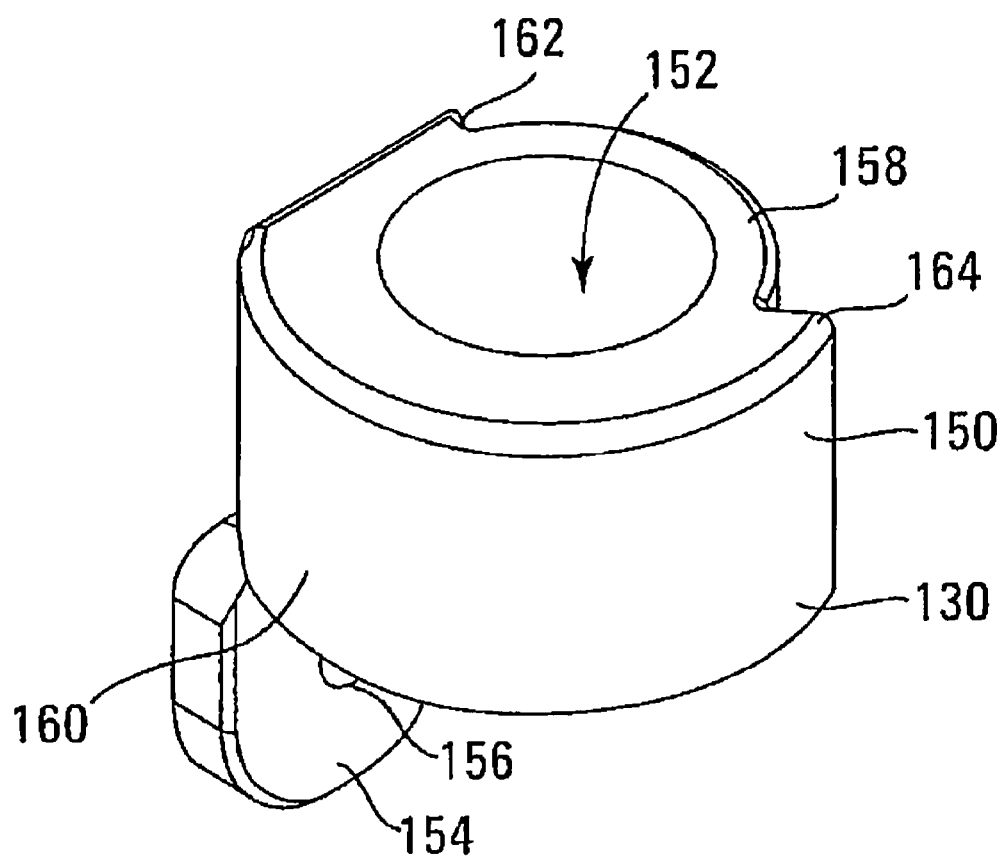
FIG. 16 is a top perspective view of a lower pivot bushing of a mount according to an embodiment of the invention.
Figure 17:
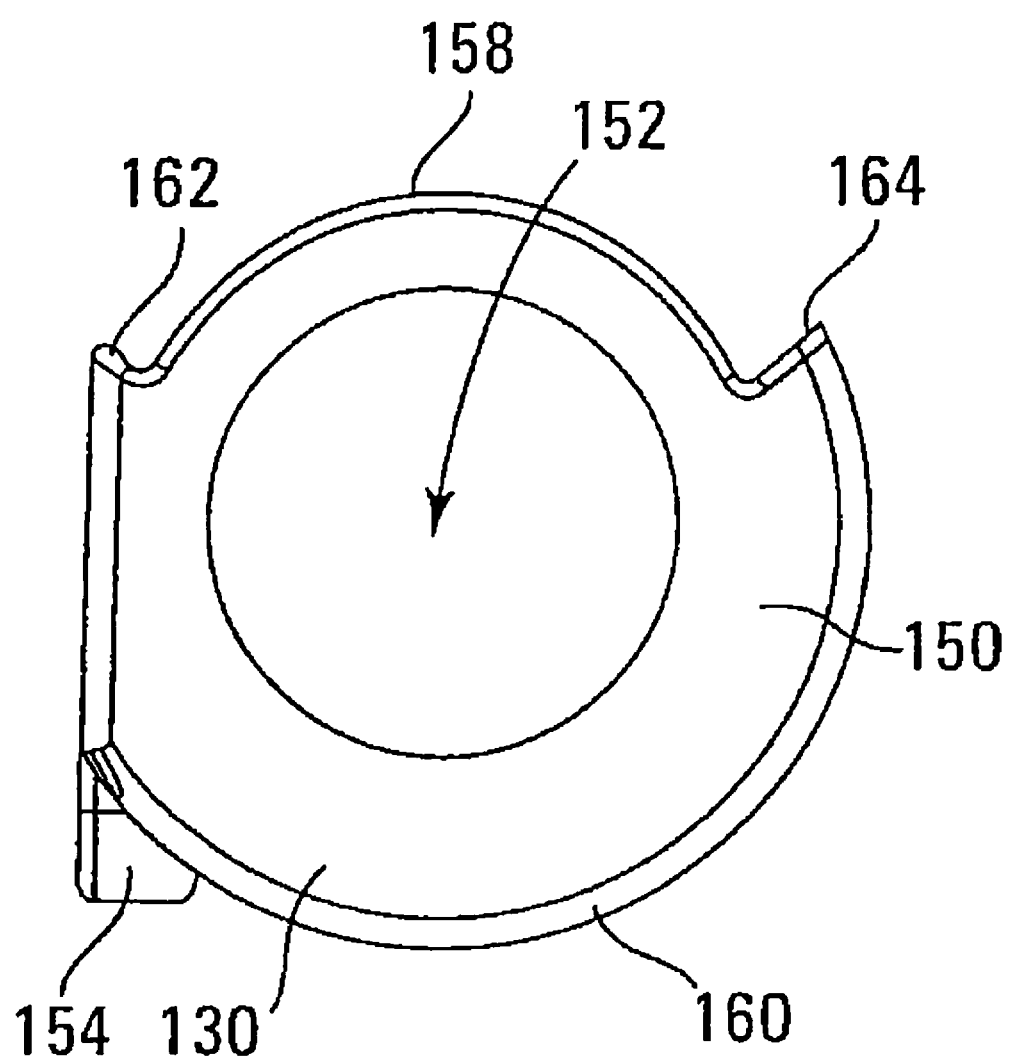
FIG. 17 is a top plan view of the bushing of FIG. 16.
Figure 18:
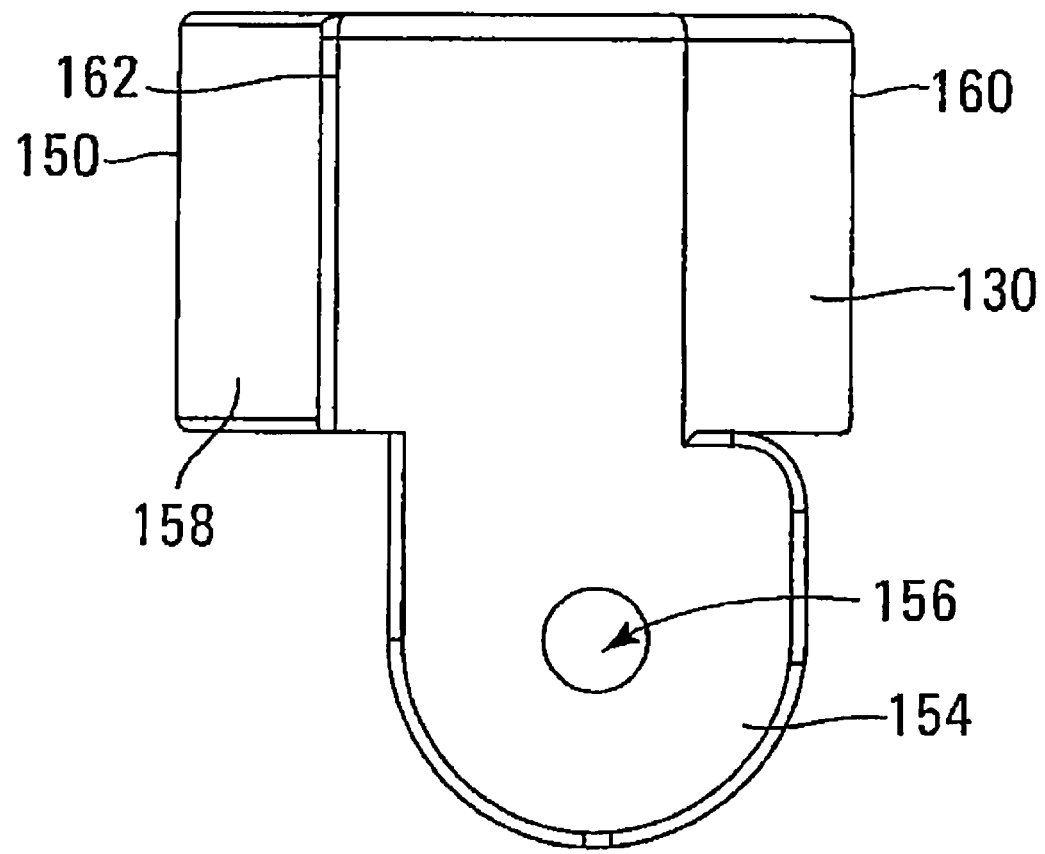
FIG. 18 is a side elevation view of the bushing of FIG. 16.

Similarly, lower pivot bushing 130, as depicted in FIGS. 16-18, generally includes body portion 150 defining central bore 152. Tab 154 extends from body portion 150 and defines pivot aperture 156. Body portion 150 is generally cylindrical with front edge 158 having a smaller radius than rear edge 160, defining a pair of shoulders 162, 164.

Upper and lower pivot bushings 128, 130, are vertically and rotationally slidably disposed on column 126, with column 126 extending through central bores 136, 152, respectively. Separate arms 118 of extendable arm assembly 110 are pivotally attached to tabs 138, 154, of each of upper and lower pivot bushings 128, 130, with pivots 166 extending into pivot apertures 140, 156.

Figure 26:
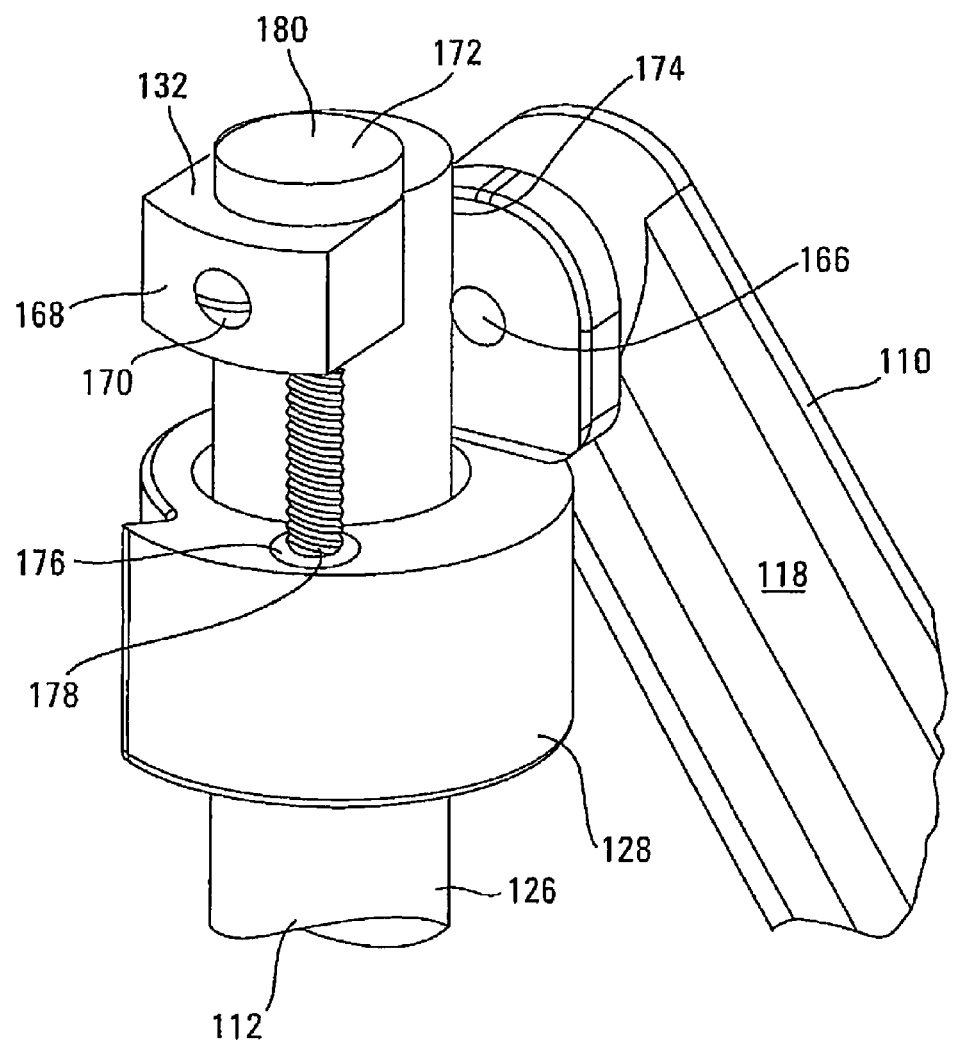
FIG. 26 is a fragmentary perspective view of the lift adjuster mechanism of a mount according to an embodiment of the invention.

Lift adjuster assembly 132 as depicted in FIG. 26 generally includes body 168, attaching fastener 170, and lift screw 172. Body 168 is attached proximate upper end 174 of column 126 with attaching fastener 170. Lift screw 172 is threadedly received in body 168 and includes bearing plate 176 at lower end 178. Thumb knob 180 may be provided on upper end 182 to enable lift screw 172 to be easily threaded in and out of body 168 with the fingers.

In use, bearing plate 176 slidably bears on upper surface 184 of upper pivot bushing 128, thereby vertically locating upper pivot bushing 128 on column 126. The relative vertical position of upper pivot bushing 128 is selectively adjustable by threading lift screw 172 in or out of body 168, thereby lowering or raising upper pivot bushing 128 relative to column 126. As extendable arm assembly 110 is extended and retracted, upper pivot bushing 128 remains in position while lower pivot bushing 130 slides vertically on column 126.

Swing limit cam 114, as depicted in FIGS. 22-25, generally includes elongate body 186 presenting lower end 188 and upper end 190. Lower end 188 has width dimension W that is generally wider than width dimension $W_1$ of upper end 190. Intermediate portion 192 is tapered, presenting upwardly sloping opposing flanks 194. Front side 196 is concave, conforming to the radius of front edge 158 of lower pivot bushing 130.

Figure 13:
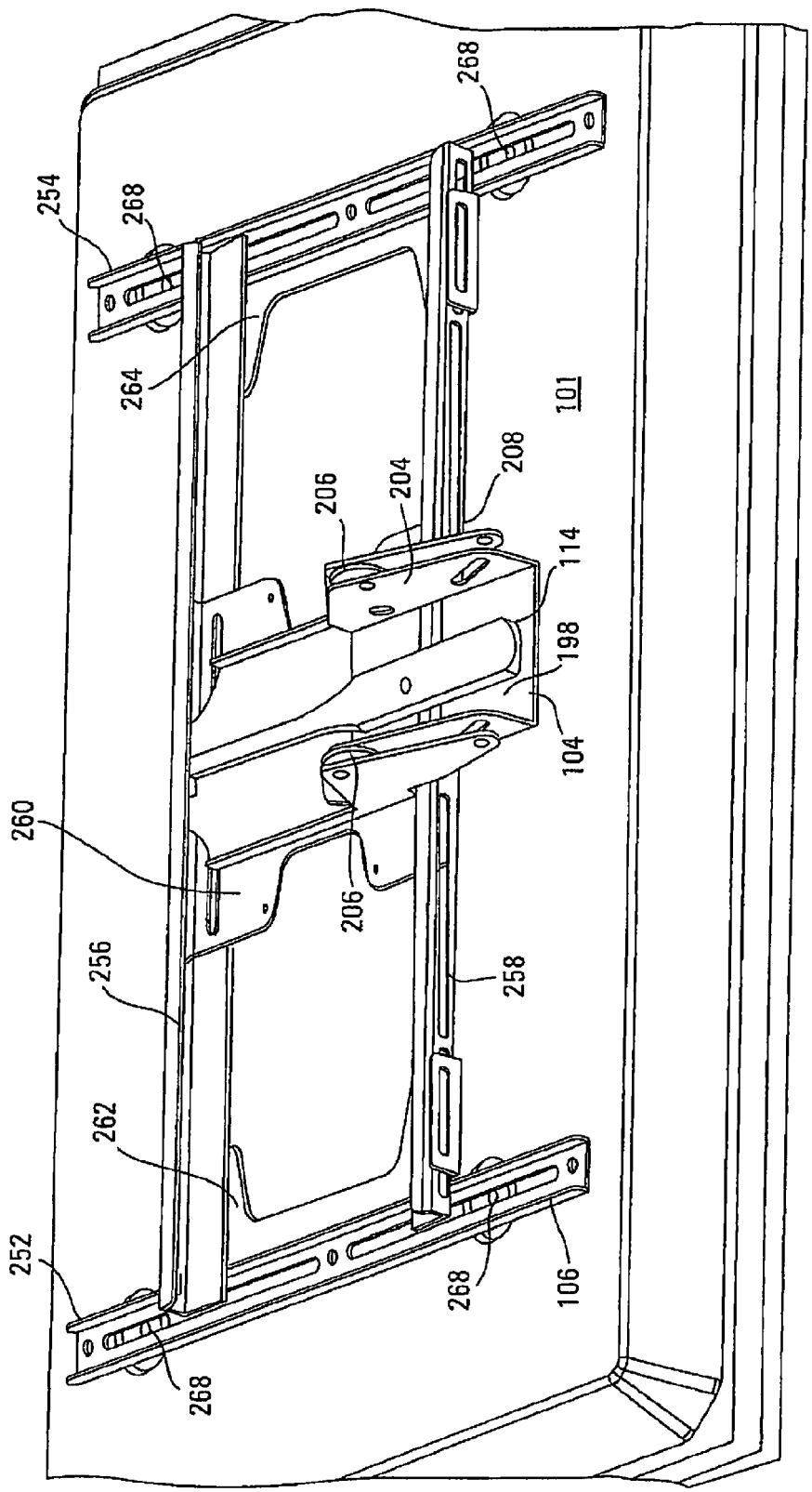
FIG. 13 is a rear perspective view of a display coupled with the tilt head and display interface structure portions of a mount according to an embodiment of the invention.
Figure 25:
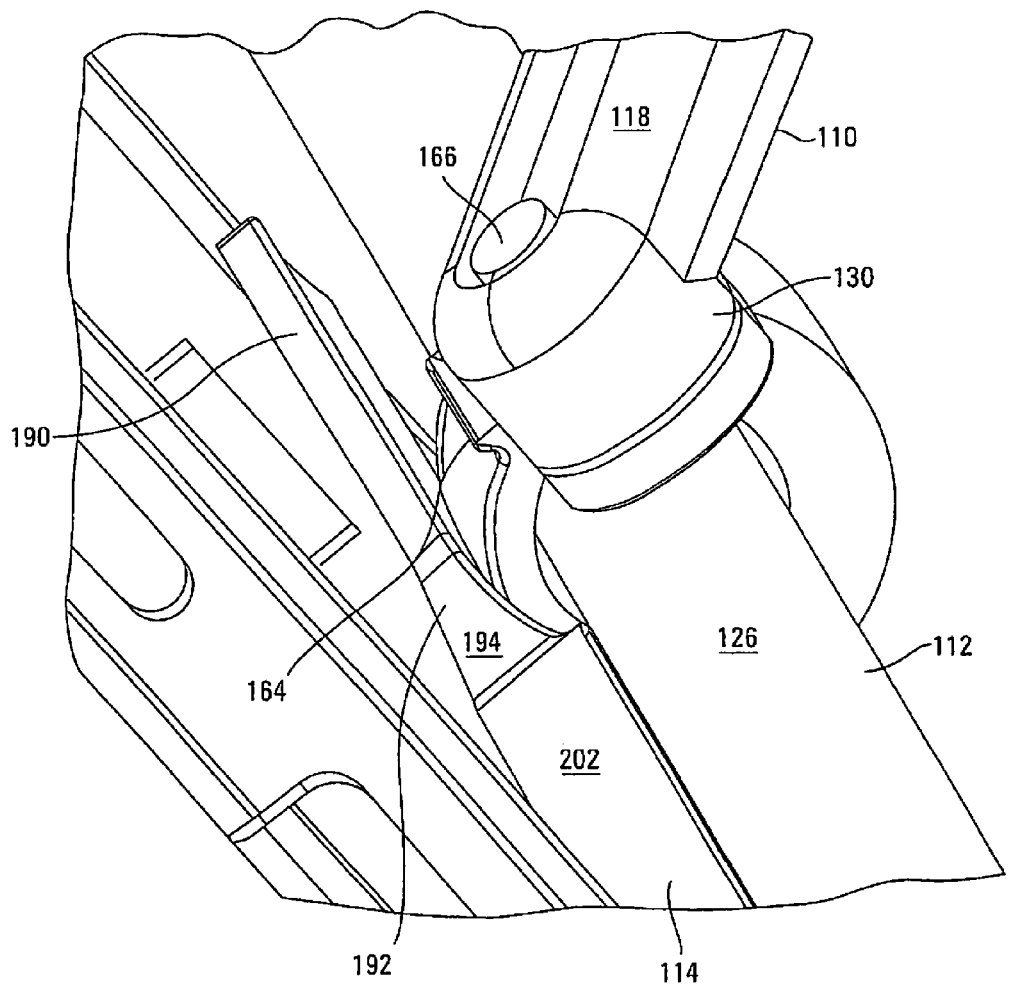
FIG. 25 is a fragmentary bottom perspective view of a portion of a mount according to an embodiment of the invention, depicting the bottom pivot bushing interfacing with the swing limit cam.

Swing limit cam 114 is affixed to the inner side 198 of tilt head 104 as depicted in FIG. 13, with front edge 158 of lower pivot bushing 130 in registry with front side 196 as depicted in FIG. 25. Column 126 is positioned along concave front side 196 of swing limit cam 114 and is fixed in rotational and vertical position relative thereto. In use, with display 101 positioned proximate wall surface 124 as depicted in FIG. 15, lower pivot bushing 130 is relatively closer to bottom end 200 of column 126. In this position, shoulders 162, 164, of lower pivot bushing 130 engage sides 202 of lower end 188 of swing limit cam 114, limiting side-to-side swinging motion of display 101 to a relatively greater degree as depicted in FIG. 15, so as to prevent contact of display 101 with wall surface 124.

As extendable arm assembly 110 is extended outward and display 101 is positioned further away from wall surface 124, lower pivot bushing 130 slides upward on column 126 and upward relative to swing limit cam 114, which is vertically fixed in position on tilt head 104. Once lower pivot bushing 130 reaches intermediate portion 192, the greater distance between each of shoulders 162, 164, and sloping flanks 194 enables a steadily increasing range of side-to-side swinging motion for display 101. When lower pivot bushing 130 reaches upper end 190 of swing limit cam 114, a full range of side-to-side swinging motion for display 101 is enabled, as depicted in FIG. 14.

It will be appreciated that the vertical position of swing limit cam 114 may be adjusted on tilt head 104 to alter the relative distance from wall surface 124 at which lower pivot bushing 130 begins to encounter intermediate portion 192 and upper end 190. Moreover, it will be appreciated that the geometry of swing limit cam 114 may be altered as desired to produce desired swing limiting characteristics. For example, swing limit cam 114 may be made relatively longer with more gently sloping flanks 194 to enable a more gradual limiting of swing motion relative to distance. In another example, opposing flanks 194 may a provided with differing slopes so as to enable a greater range of swing motion in one direction relative to the opposing direction.

Tilt head 104 is generally attached intermediate support structure 103 and display interface structure 106. In a first example embodiment, tilt head 104 generally includes inner yoke 204, pitch cams 206, and pitch member 208, as depicted in FIGS. 8-11. In a second example embodiment, tilt head 104 generally includes body portion 210, a pair of inner pitch arms 212, a pair of outer pitch arms 214, and a display interface assembly 216, as depicted in FIGS. 27-32.

Referring to the first example embodiment of tilt head 104 depicted in FIGS. 8-11, inner yoke 204 generally includes back plane 218 defining laterally oriented opening 220, and having parallel projecting flanges 222, 224. Each of flanges 222, 224, define upright guide structure 226, first oblong aperture 228, and second oblong aperture 230, in lateral registry across tilt head 104.

Figure 10:
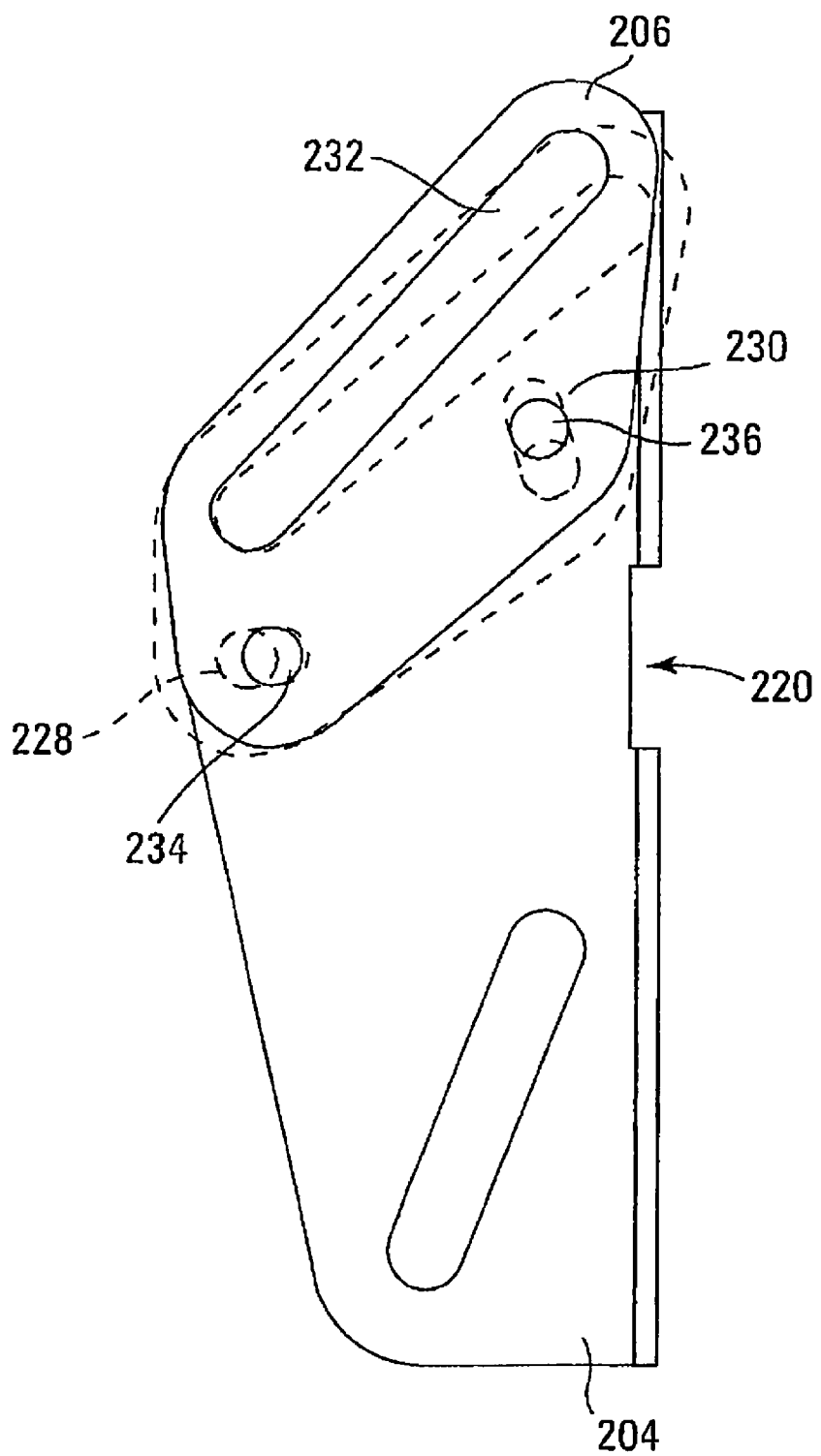
FIG. 10 is a fragmentary side elevation view of the tilt head of FIG. 9 with the pitch member removed for clarity.
Figure 11:
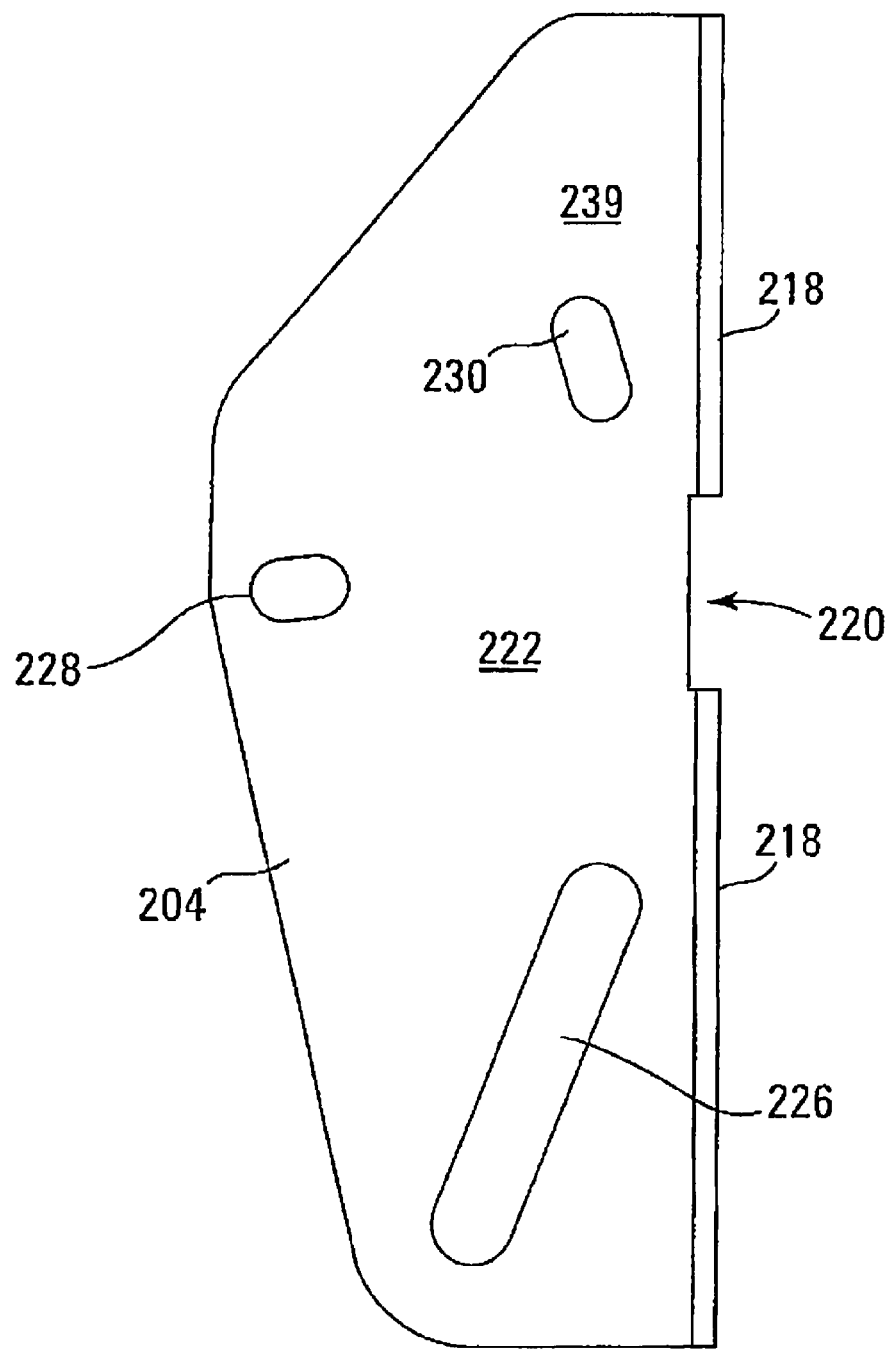
FIG. 11 is a fragmentary side elevation view of the inner yoke of the tilt head of FIG. 9.

Each pitch cam 206 defines a guide structure 232, which may be in the form of an elongate slot, and a pair of apertures 234, 236. Pitch cams 206 are secured on the outer surface 238 of each of flanges 222, 224, with aperture 234 in registry with oblong aperture 228 and aperture 236 in registry with oblong aperture 230. Travelers (not depicted) extend through each of the registered aperture pairs 228, 234 and 230, 236. The travelers are slidable in oblong apertures 228, 230 such that pitch cams 206 are selectively positionable relative to inner yoke 204 as depicted in FIG. 10.

Pitch member 208 generally includes back plane 239 having parallel projecting flanges 240, 242. Each of flanges 240, 242, define apertures 244, 246, in lateral registry across tilt head 104. Inner yoke 204 and pitch cams 206 are disposed between flanges 240, 242, with apertures 244 in registry with guide structures 232, and apertures 246 in registry with guide structures 226. Followers 248 extend through apertures 244 and slidably engage in each guide structure 232, and followers 250 extend through apertures 246 and slidably engage in each guide structure 226.

Display interface structure 106 as depicted in FIG. 13, generally includes vertical uprights 252, 254, horizontal braces 256, 258, central reinforcing plate 260, and gusset plates 262, 264. Vertical uprights 252, 254, are secured to back side 266 of display 101 with fasteners 268. Horizontal braces 256, 258, are secured to vertical uprights 252, 254, and are coupled with gusset plates 262, 264. Central reinforcing plate 260 extends between and is secured to horizontal braces 256, 258. Pitch member 208 engages and is secured to horizontal braces 256, 258.

Figure 12:
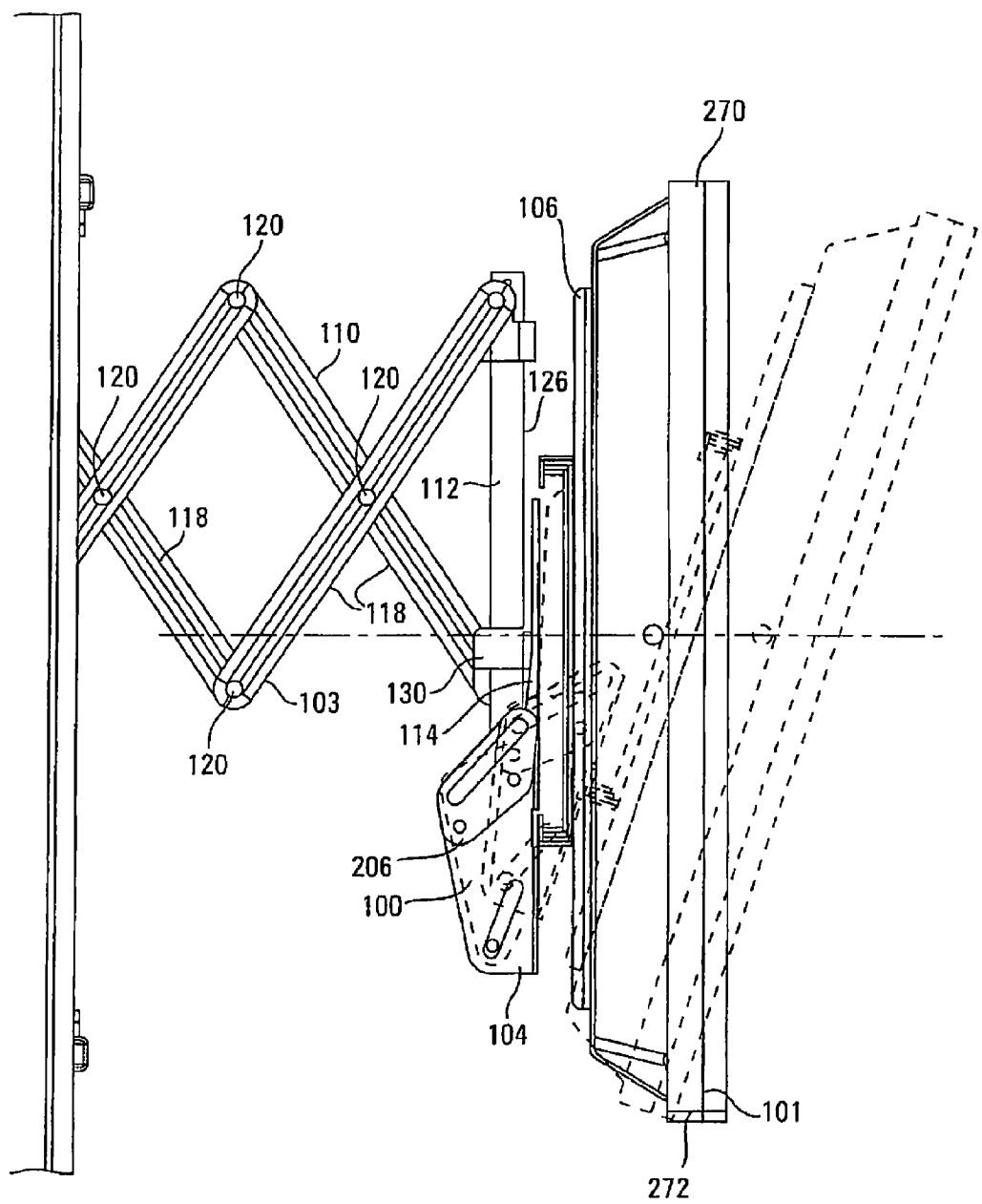
FIG. 12 is a side elevation view of the mount and display of FIG. 3, depicting the tilting motion of the display.

In use, as depicted in FIG. 12, display 101 is tiltable about a generally horizontal tilt axis by grasping the top edge 270 of the display 101 and pulling outward. As display 101 tilts, followers 248 slide in guide structures 232, and followers 250 slide in guide structures 226 to guide and define the tilting path of travel for display 101. Notably, as display 101 tilts forward, bottom edge 272 maintains substantially the same distance from wall surface 124. Hence, even when extendable arm assembly 110 is retracted so that display 101 is positioned immediately proximate wall surface 124, display 101 will not contact wall surface 124 at any point in the tilting motion.

Another desirable feature of tilt head 104 as also depicted in FIG. 12 is that guide structures 226 and guide structures 232 may be oriented so as to define a path of travel about a tilt axis located generally below and forward of display 101, such that center of gravity 274 translates along a substantially horizontal axis 198, and the display 101 is substantially "self-balancing." That is, display 101 will maintain a desired tilt position without being held by a secondary friction source.

It will be appreciated that the position of pitch cams 206 may be adjusted so as to alter the position of the tilt axis for display 101 and also the path along which the center of gravity will translate upon tilting. Further, it will be appreciated that the shape of guide structures 226, 232, may be altered so as to give a desired effect to the tilt motion of display 101. For example, guide structures 226, 232, may be substantially straight as depicted, or either or both may be curved, angular, or any other desired shape. Guide structures 226, 232 themselves, although depicted as slots, may be any other suitable structure capable of guiding a follower, such as channels, grooves, cam surfaces, and the like.

Figure 40:
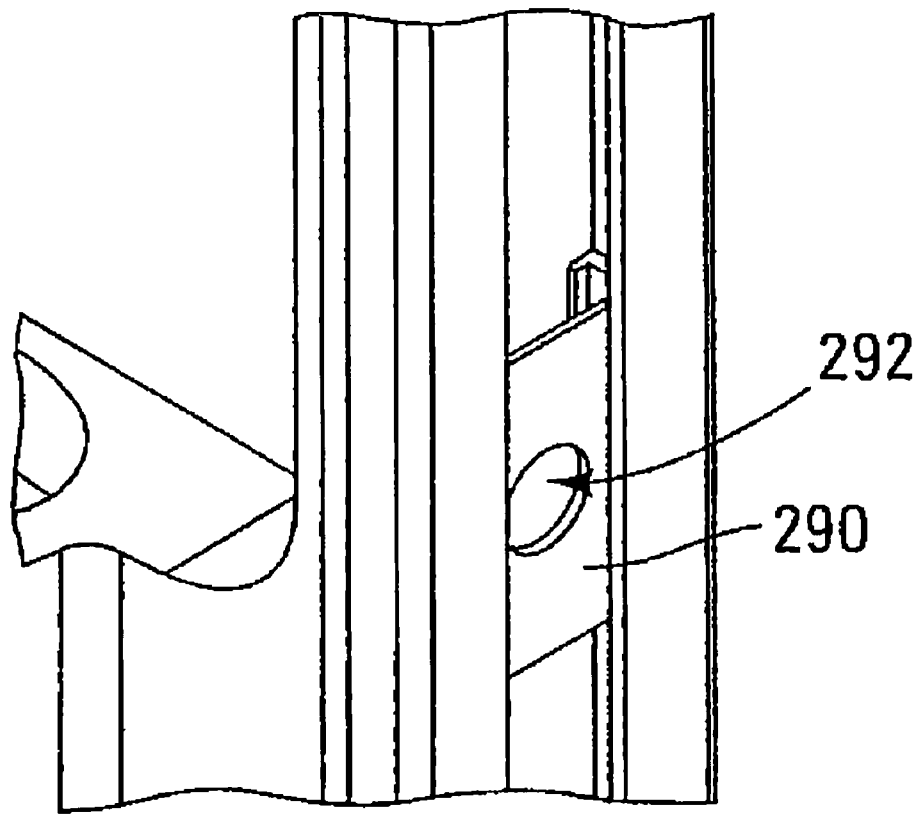
FIG. 40 is a fragmentary perspective view of the slide block and guide track of a mount according to an embodiment of the invention.
Figure 41:
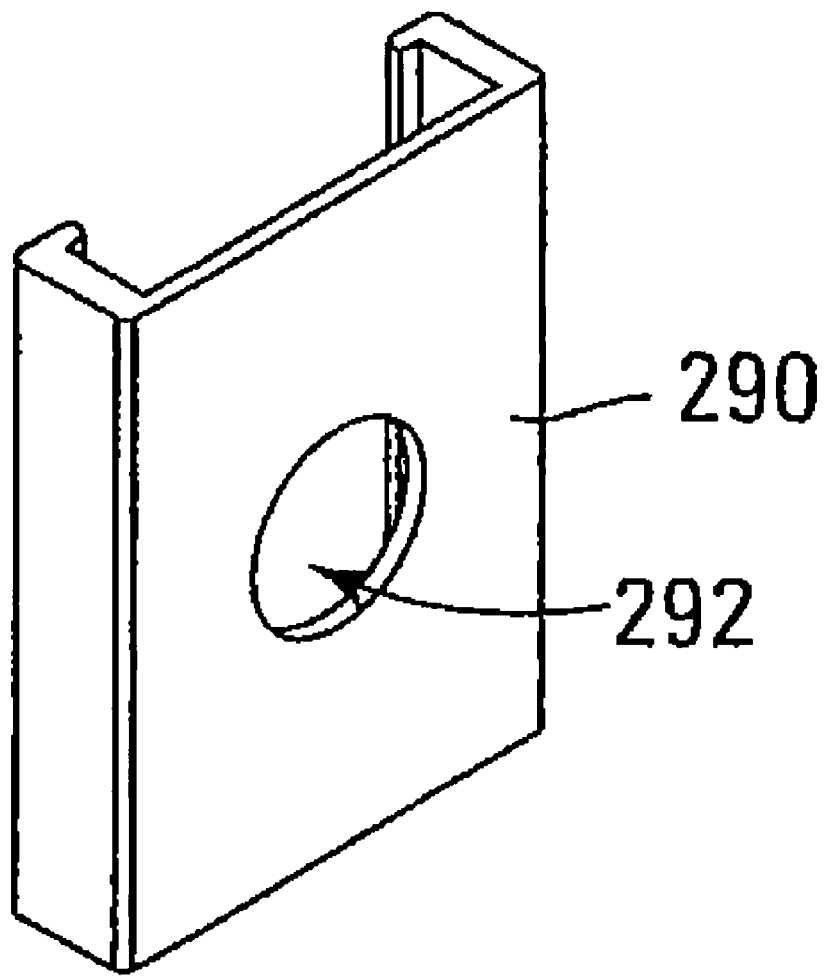
FIG. 41 is a perspective view of a slide block component of a mount according to an embodiment of the invention.
Figure 42:
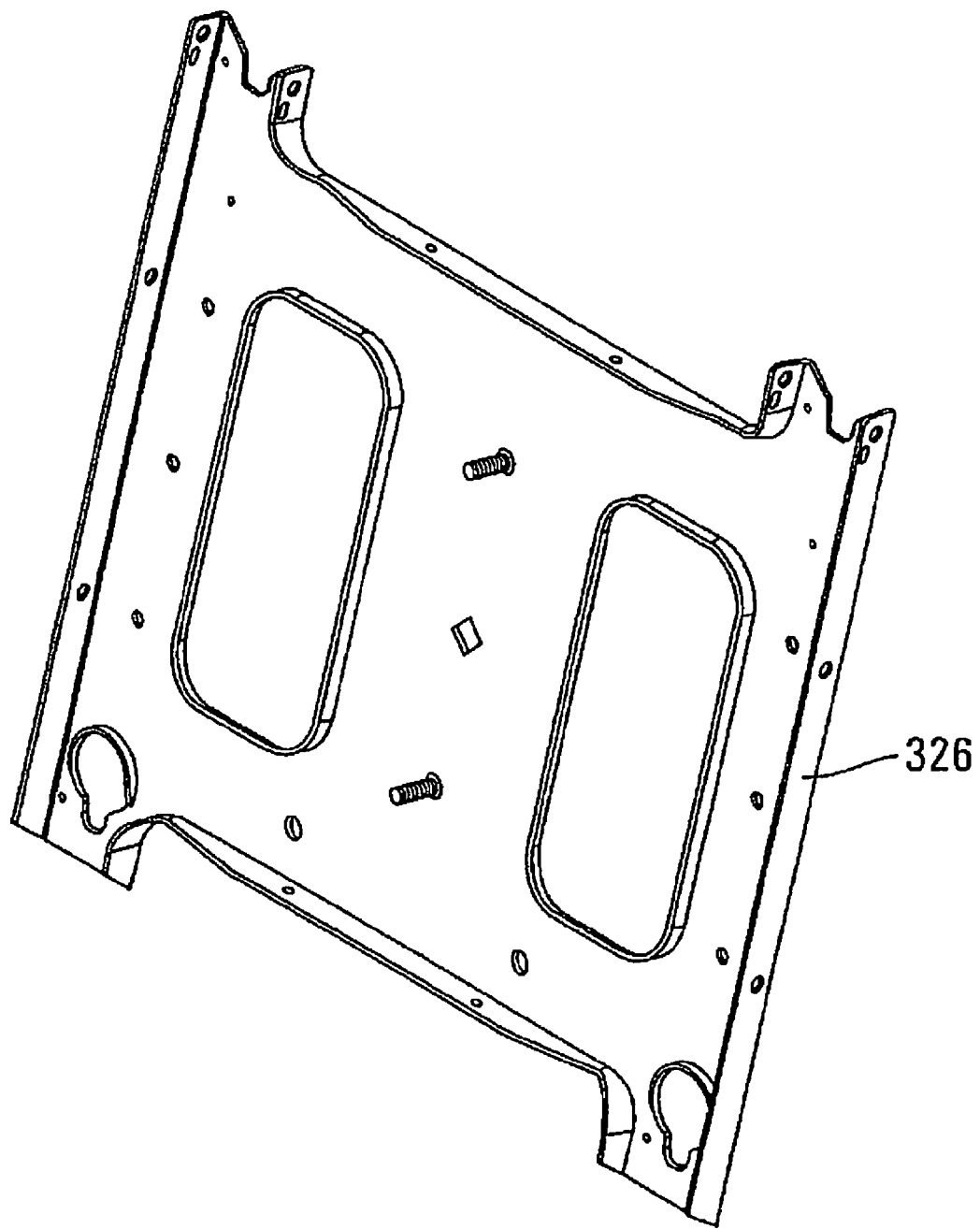
FIG. 42 is a perspective view of the second mounting plate component of a mount according to an embodiment of the invention.
Figure 43:
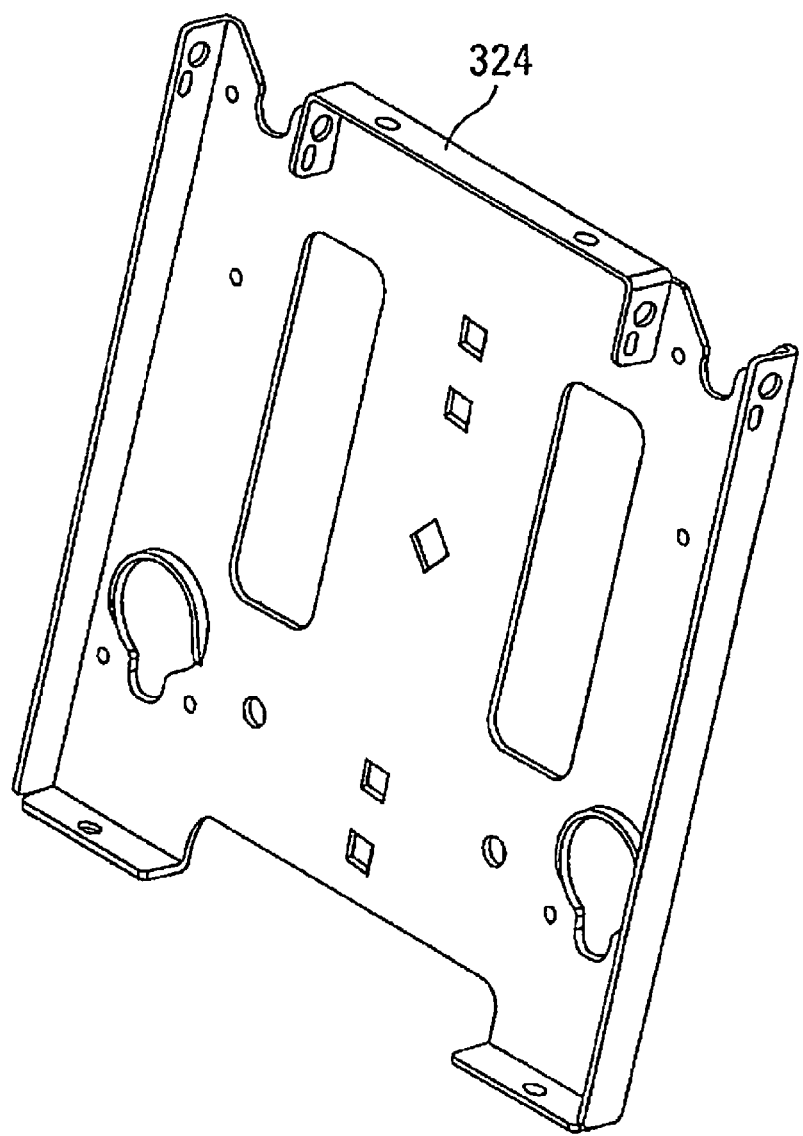
FIG. 43 is a perspective view of the first mounting plate component of a mount according to an embodiment of the invention.

Referring to the second example embodiment of tilt head 104 depicted in FIGS. 27-32, body portion 210 generally includes yoke portion 276 with a pair of projecting uprights 278, 280. Yoke portion 276 defines central bore 282, of which a portion proximate bottom end 284 may be threaded to receive threaded coupler 286. Each of uprights 278, 280, defines guide track 288 facing laterally outward. A slide block 290 is slidably disposed in each guide track 288 as depicted in FIG. 40. Slide block 290 defines aperture 292. Each upright 278, 280, defines aperture 294 therethrough proximate top end 296.

Inner pitch arm 212 is elongate, presents opposing ends 298, 300, and defines apertures 302, 304 proximate ends 298, 300, respectively. Inner pitch arm 212 further defines aperture 306 intermediate ends 298, 300.

Outer pitch arm 214 is also elongate, presents opposing ends 308, 310, and defines apertures 312, 314 proximate ends 308, 310, respectively. Clearance notch 316 is defined in lateral margin 318 proximate aperture 320.

Display interface assembly 216 generally includes interface plate 322, first mounting plate 324, and second mounting plate 326. Interface plate 322 includes display attachment portion 328 and projecting parallel flanges 330, 332. Display attachment portion 328 defines apertures 334 and elongate apertures 336 for attaching first and second mounting plates 324, 326 and display 101 with fasteners (not depicted). Each flange 330, 332 defines elongate guide slot 338 and pivot apertures 340.

Each inner pitch arm 212 is pivotally coupled to one of uprights 278, 280, with a pivot pin 342 extending through aperture 294. The other end of each inner pitch arm 212 is coupled with interface plate 322 with pivot 344 slidable in elongate guide slot 338. Each outer pitch arm 214 is pivotally coupled to slide block 290 with pivot 346 extending through aperture 292. The other end of each outer pitch arm 214 is pivotally coupled to interface plate 322 with pivot pin 348 extending through apertures 312, 314, 340. Notch 316 enables outer pitch arm 214 to clear pivot 344 when mount 100 is positioned in an upright position, as depicted in FIG. 27.

Figure 27:
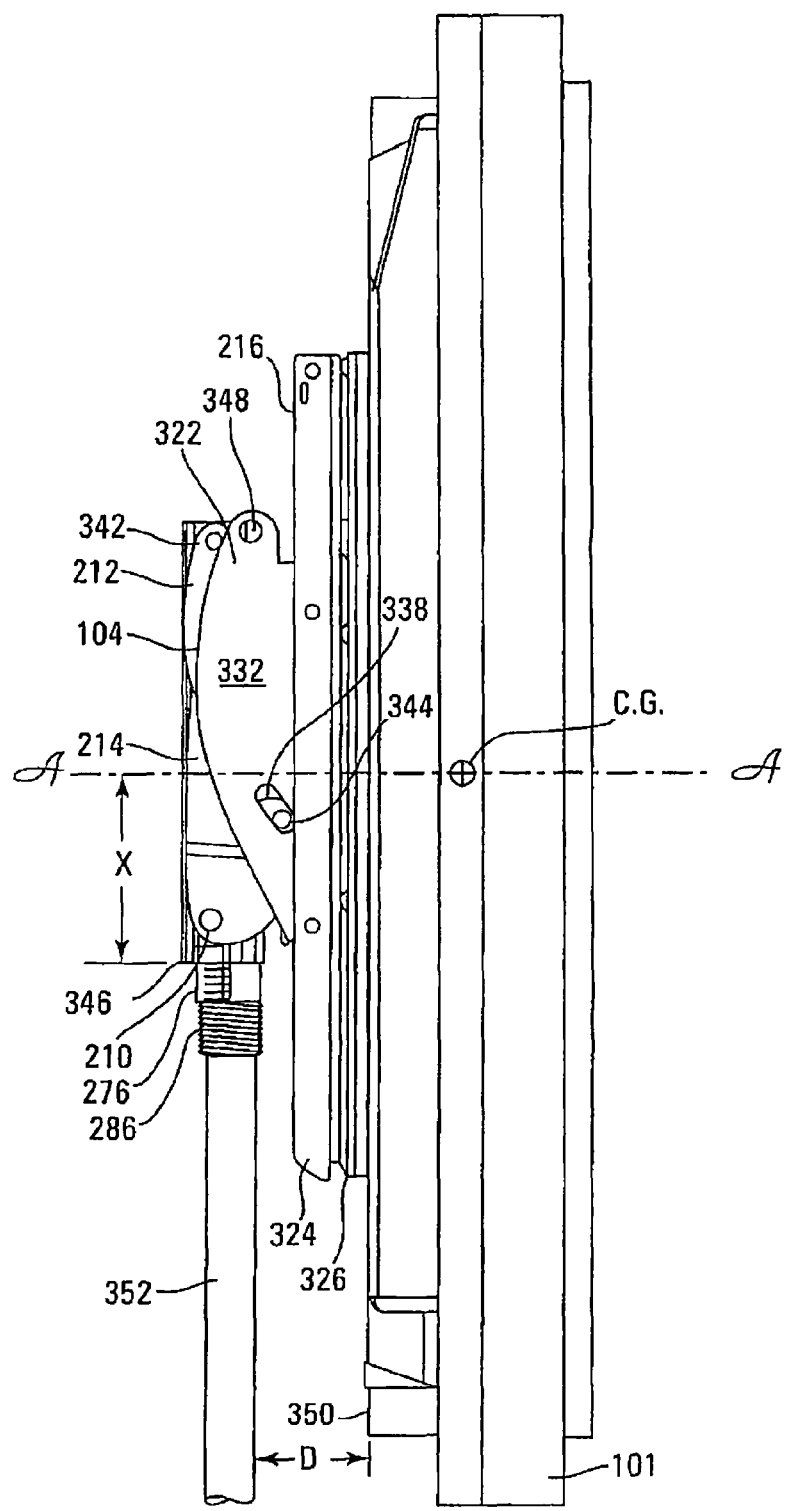
FIG. 27 is a side elevation view of a mount and display according to an embodiment of the invention with the display in an upright position.

In use, display 101 may be first disposed in a generally vertical upright position, as depicted in FIG. 27. Lower corner 350 is disposed a distance D from upright column 352 of extendable arm assembly 110, upon which yoke portion 276 is received. Center of gravity C.G. of display 101 is disposed along generally horizontal axis A-A, which is a distance X above bottom end 284 of yoke portion 276.

Figure 28:
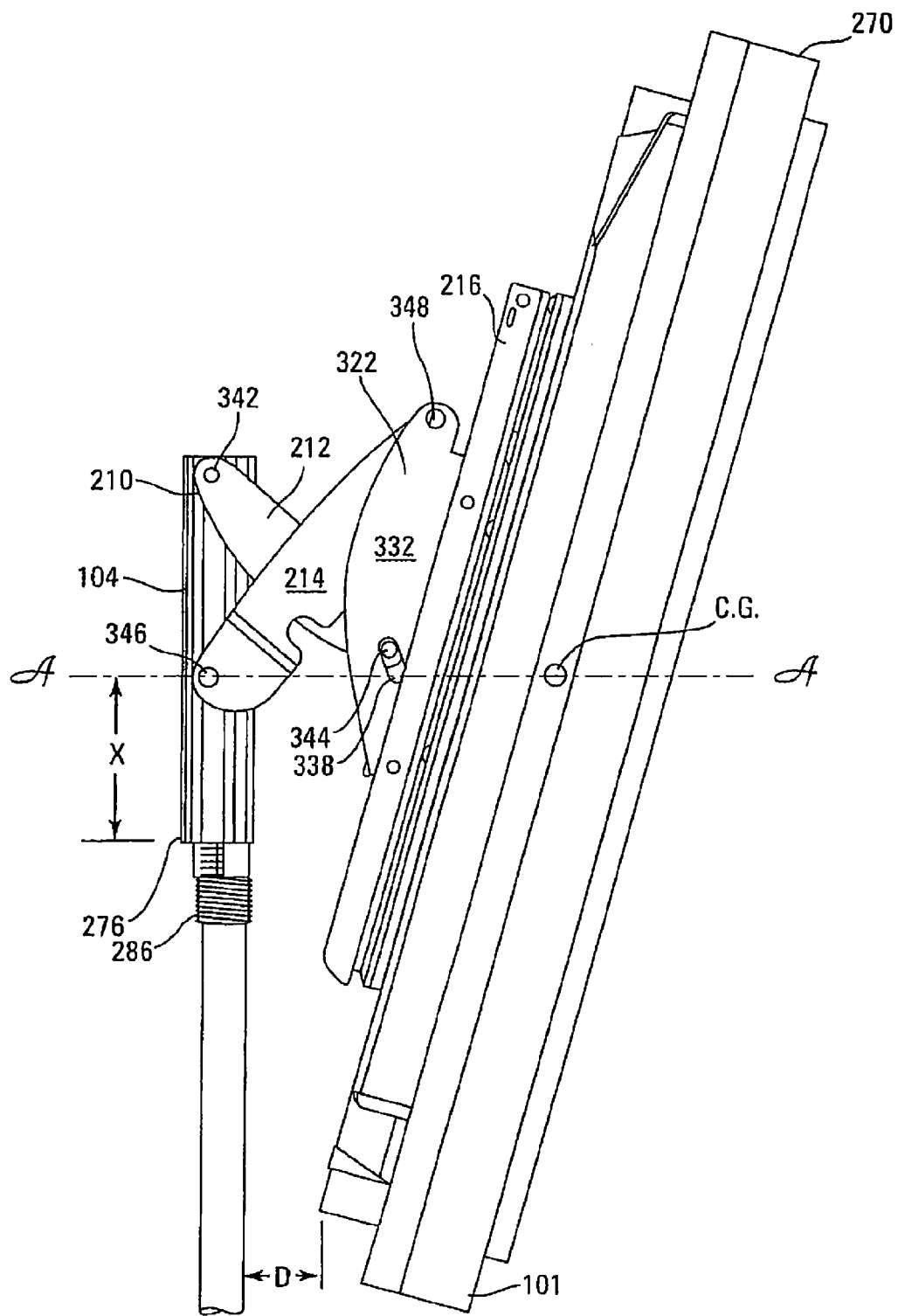
FIG. 28 is a side elevation view of the mount and display depicted in FIG. 4 with the display in a fully tilted position.
Figure 29:
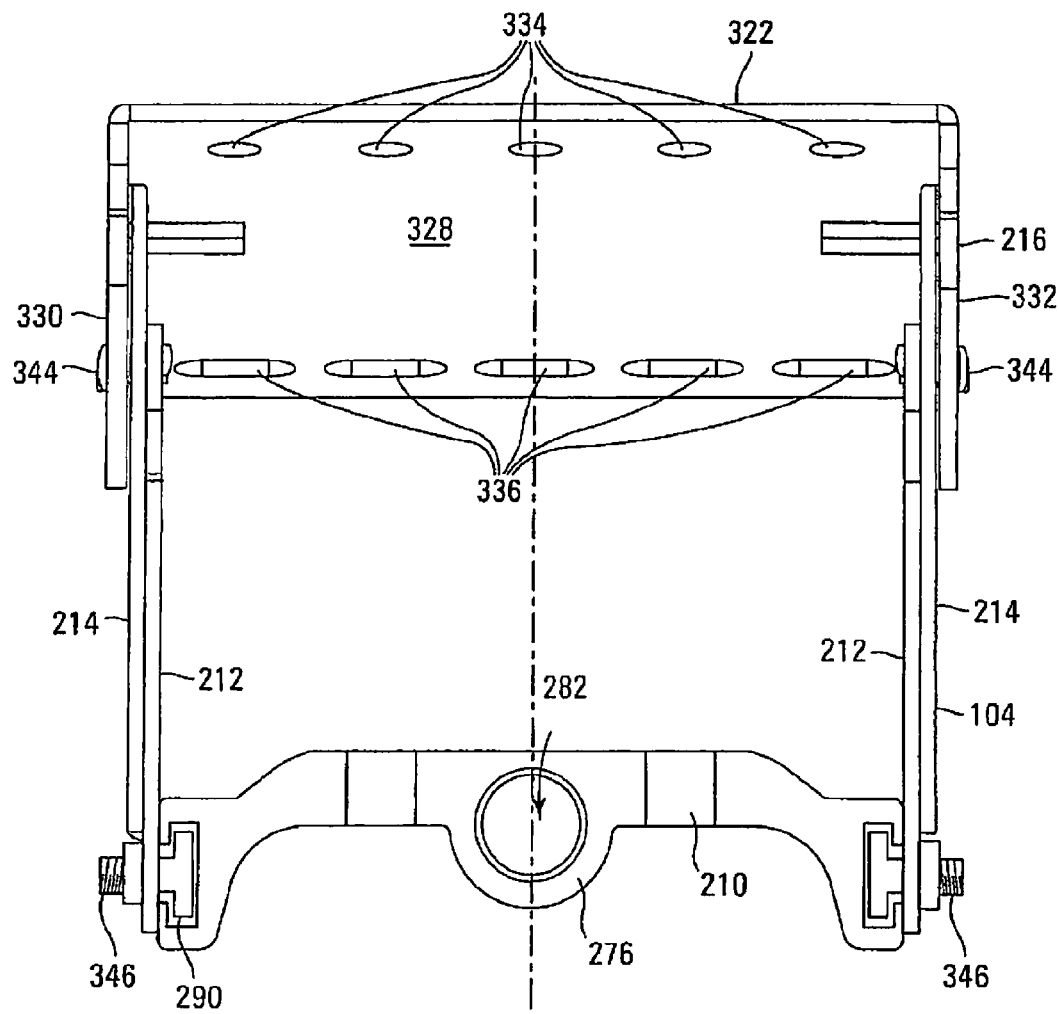
FIG. 29 is a top plan view of a mount according to an embodiment of the invention.
Figure 44:
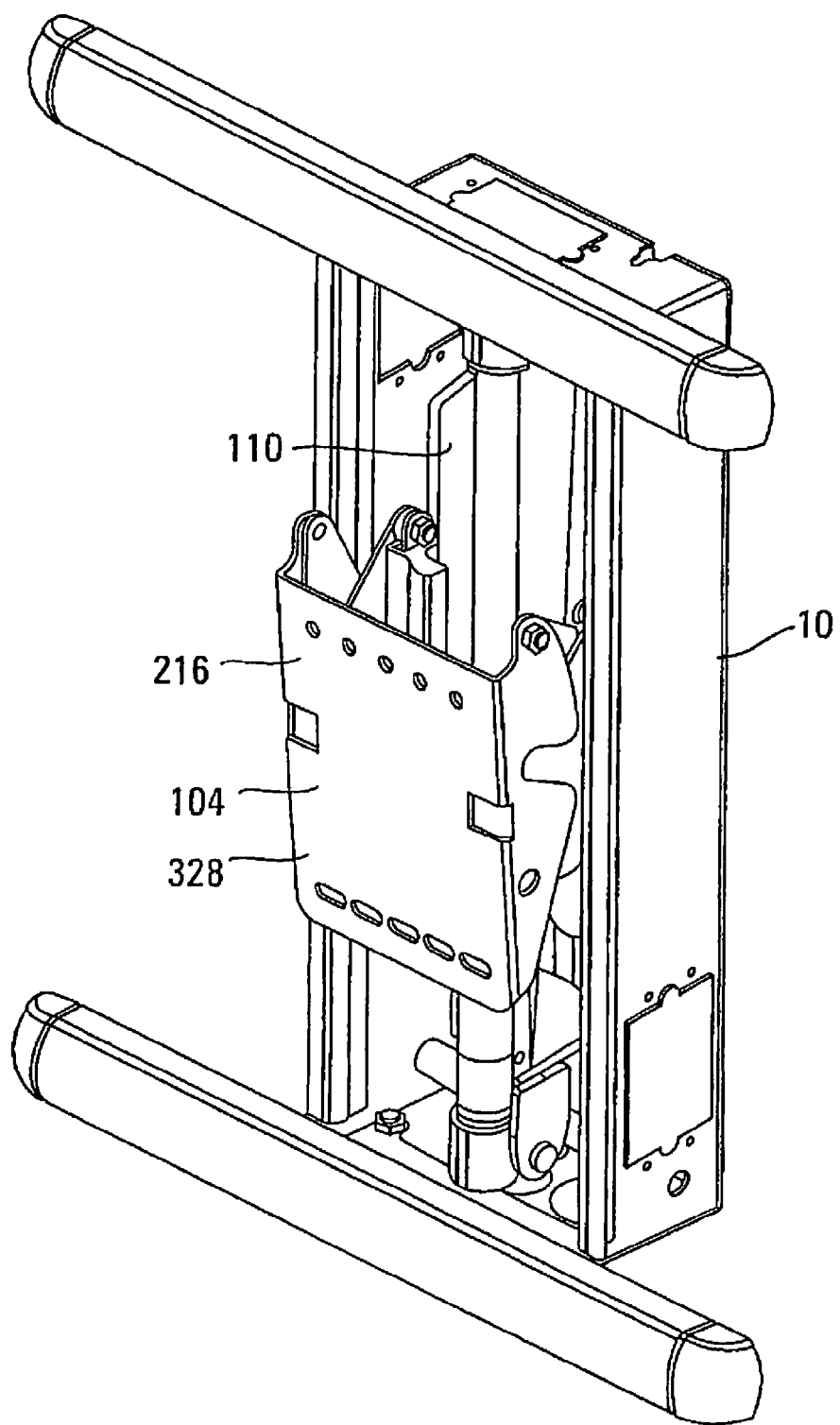
FIG. 44 is a perspective view of a mount according to an embodiment of the invention with an in-wall mounting interface.

A user may selectively tilt display 101 forward as depicted in FIG. 28 by grasping and pulling top edge 270 of display 101. As the user pulls, each inner pitch arm 212 pivots about pivots 344, 346, and pivot 344 slides in elongate guide slot 338. Simultaneously, each outer pitch arm 214 pivots about pivots 346, with each slide block 290 sliding upward in guide tracks 288. Advantageously, center of gravity C.G. of display 101 translates substantially along axis A-A, which is maintained at distance X above the bottom end 284 of yoke portion 276, while lower corner 350 remains substantially at the same distance D from upright column 352. The effect is for display 101 to be essentially self-balancing, able to maintain any desired tilt position between the upright position depicted in FIG. 27 and the fully tilted position depicted in FIG. 28 without the addition of significant additional friction between any of the components of mount 100. Further, the lower corner 350 of display 101 maintains an essentially constant distance from wall assembly 354 as display 101 is tilted, thereby eliminating the problem of display 101 striking wall assembly 354, even when mount 100 is fully retracted as depicted in FIG. 44.

Figure 30:
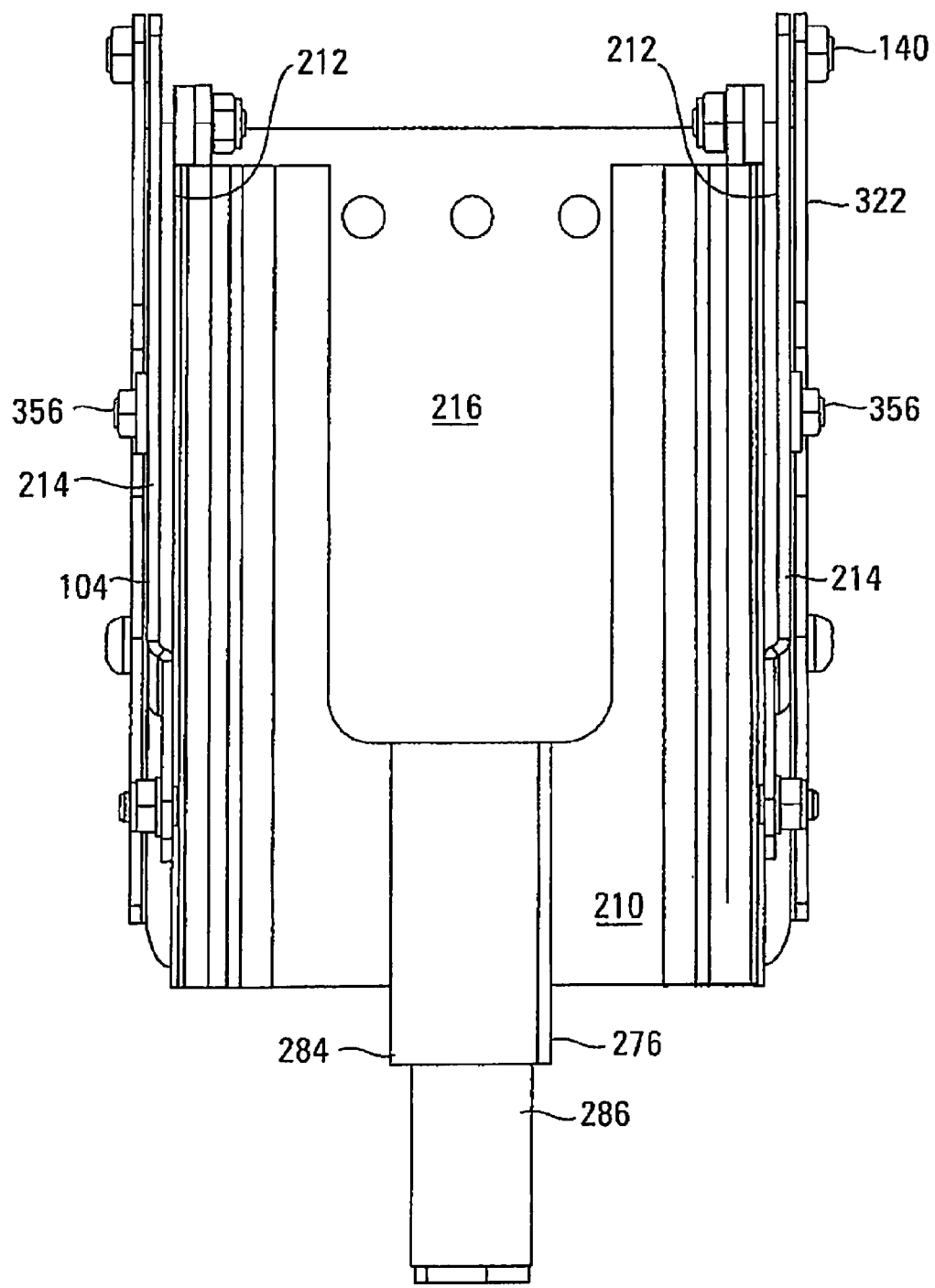
FIG. 30 is a rear elevation view of a mount according to an embodiment of the invention.
Figure 31:
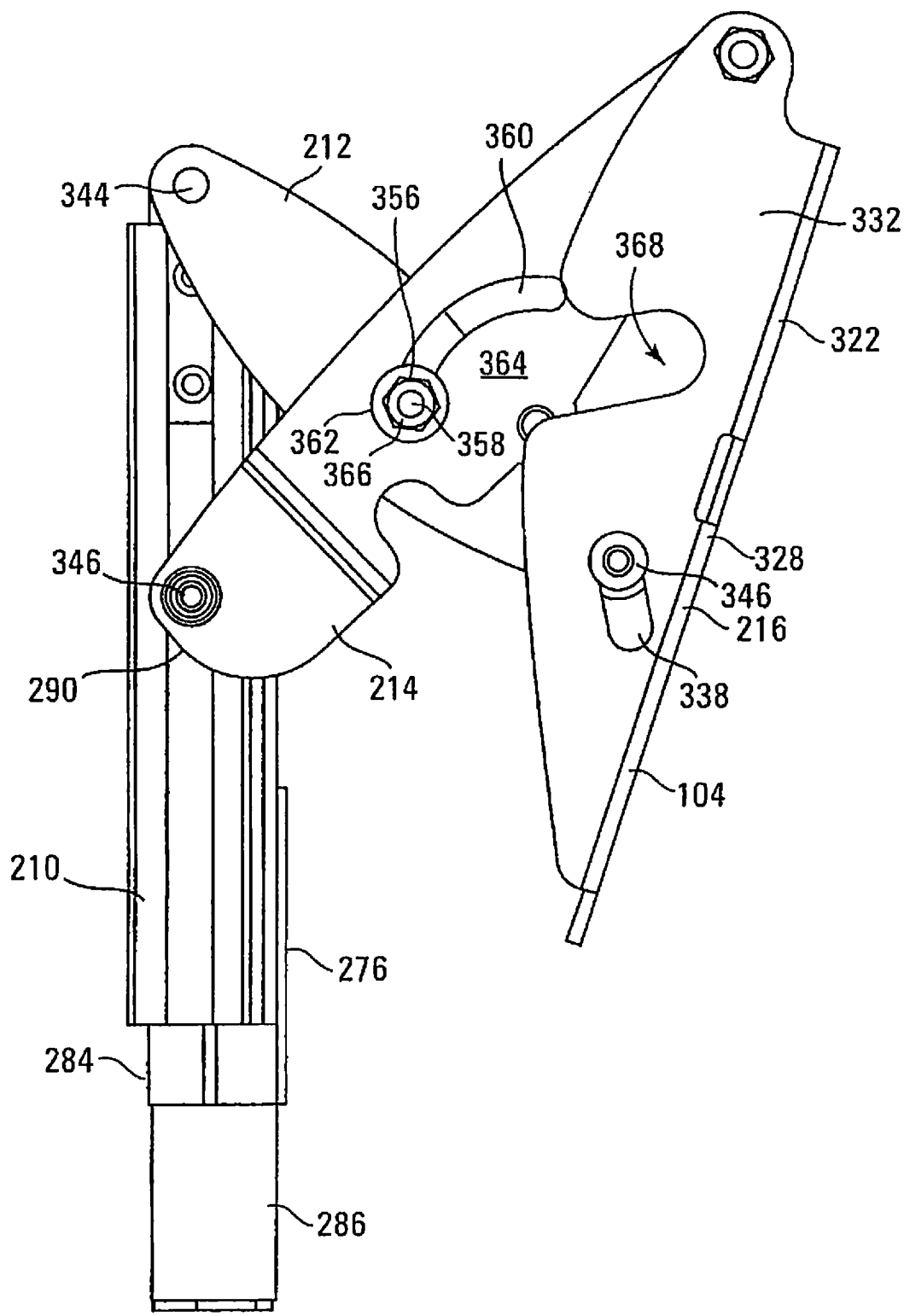
FIG. 31 is a side elevation view of the mount depicted in FIG. 7.
Figure 32:
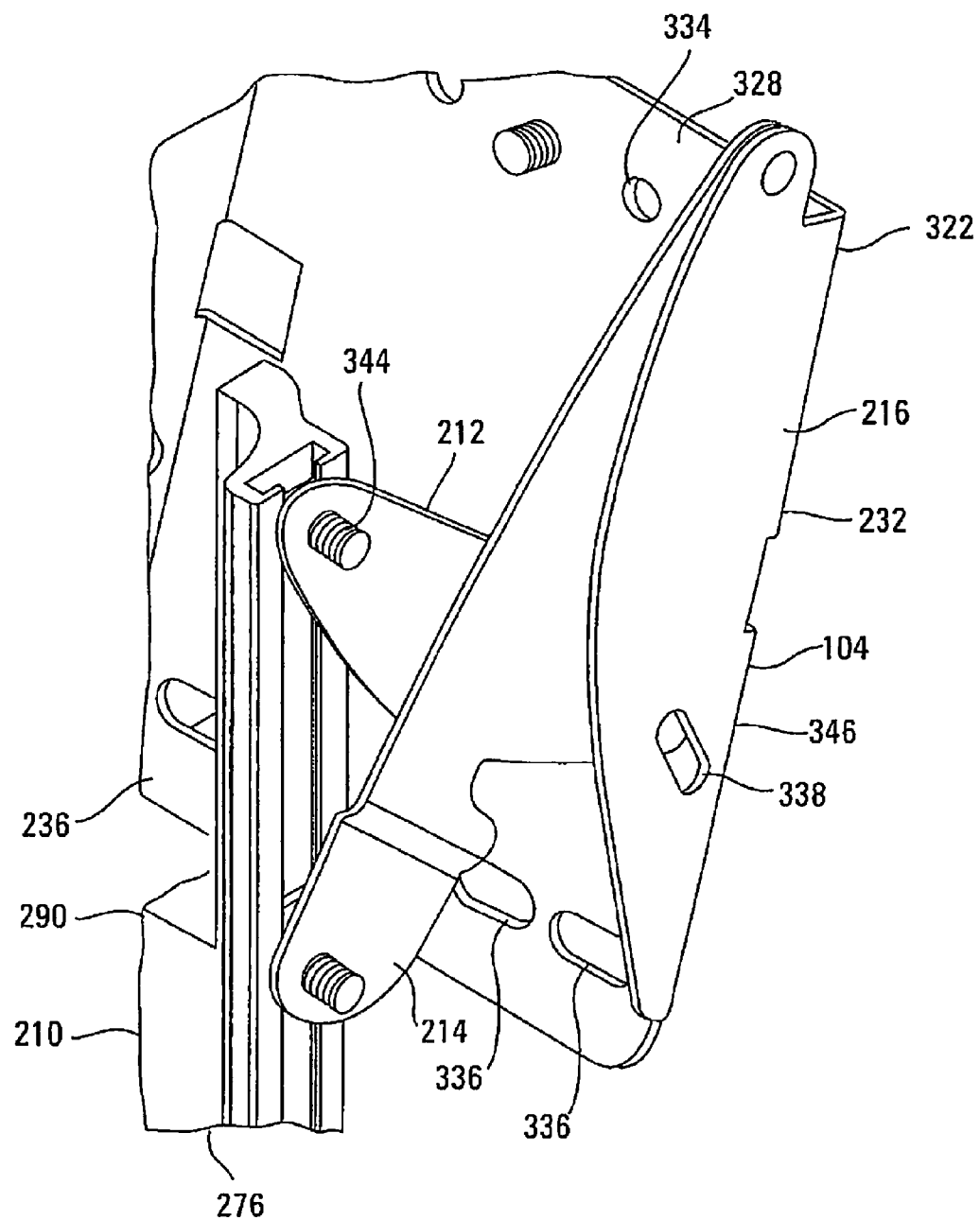
FIG. 32 is a fragmentary perspective view of a mount according to an embodiment of the invention, depicted in a tilt position.
Figure 33:
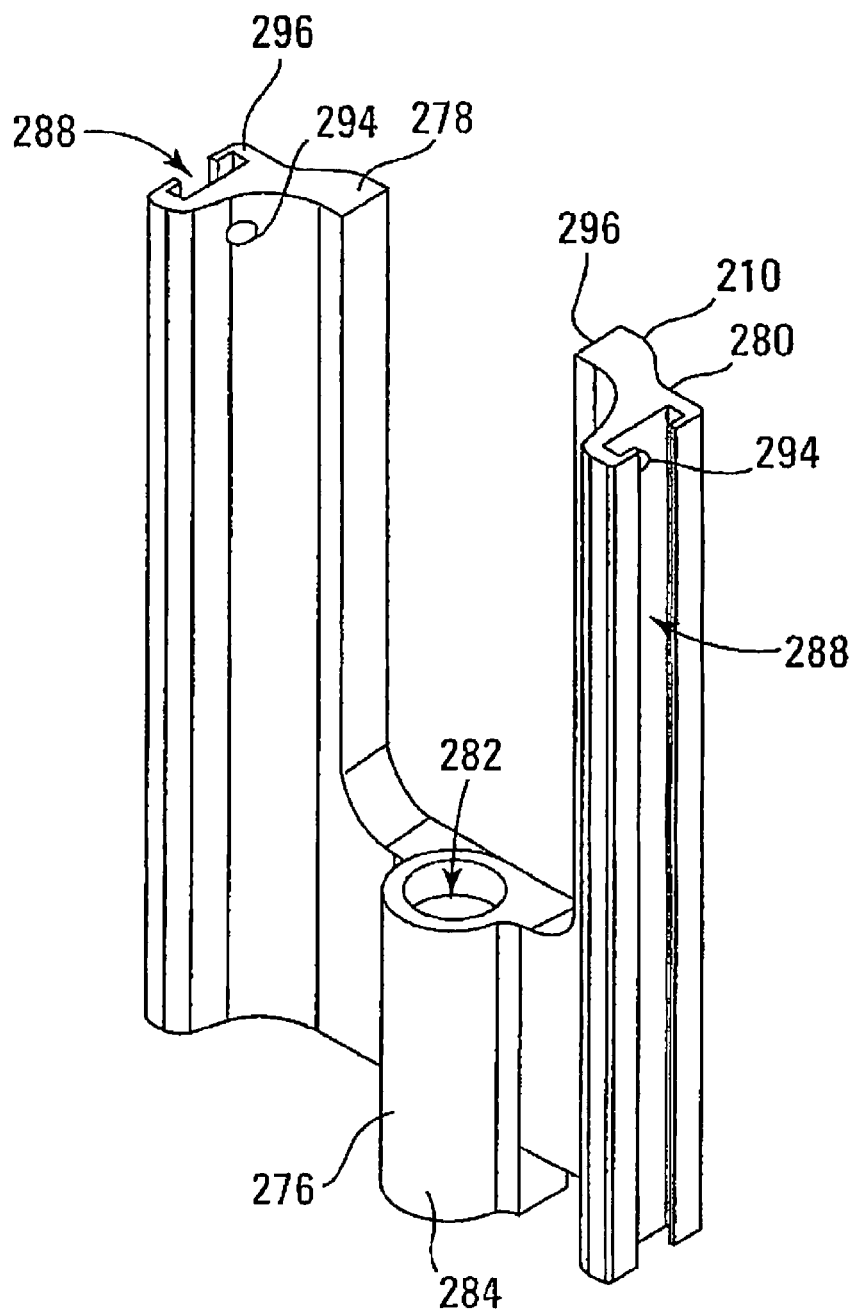
FIG. 33 is a perspective view of the yoke component of a mount according to an embodiment of the invention.
Figure 34:
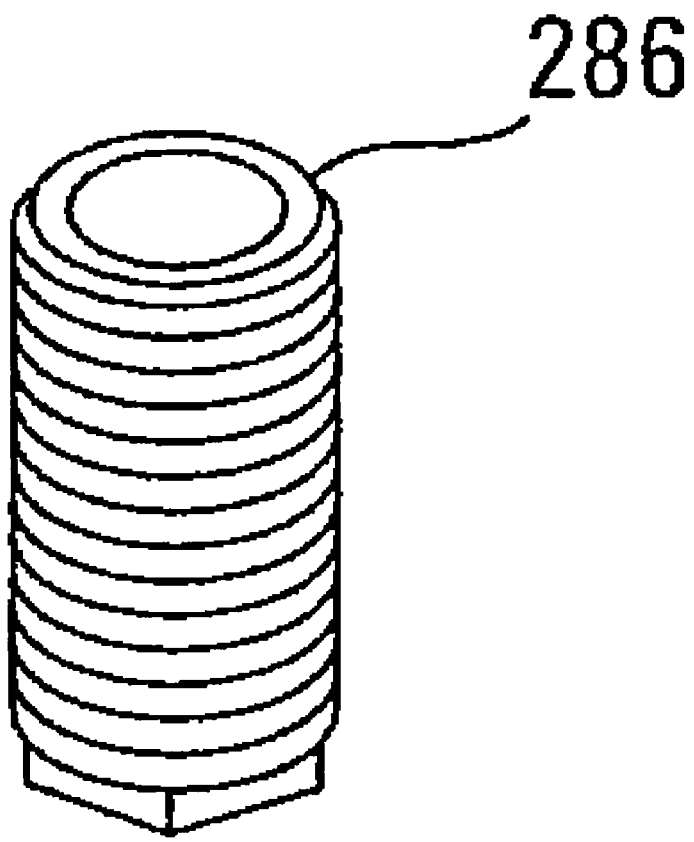
FIG. 34 is a perspective view of the threaded coupler component of a mount according to an embodiment of the invention.
Figure 35:
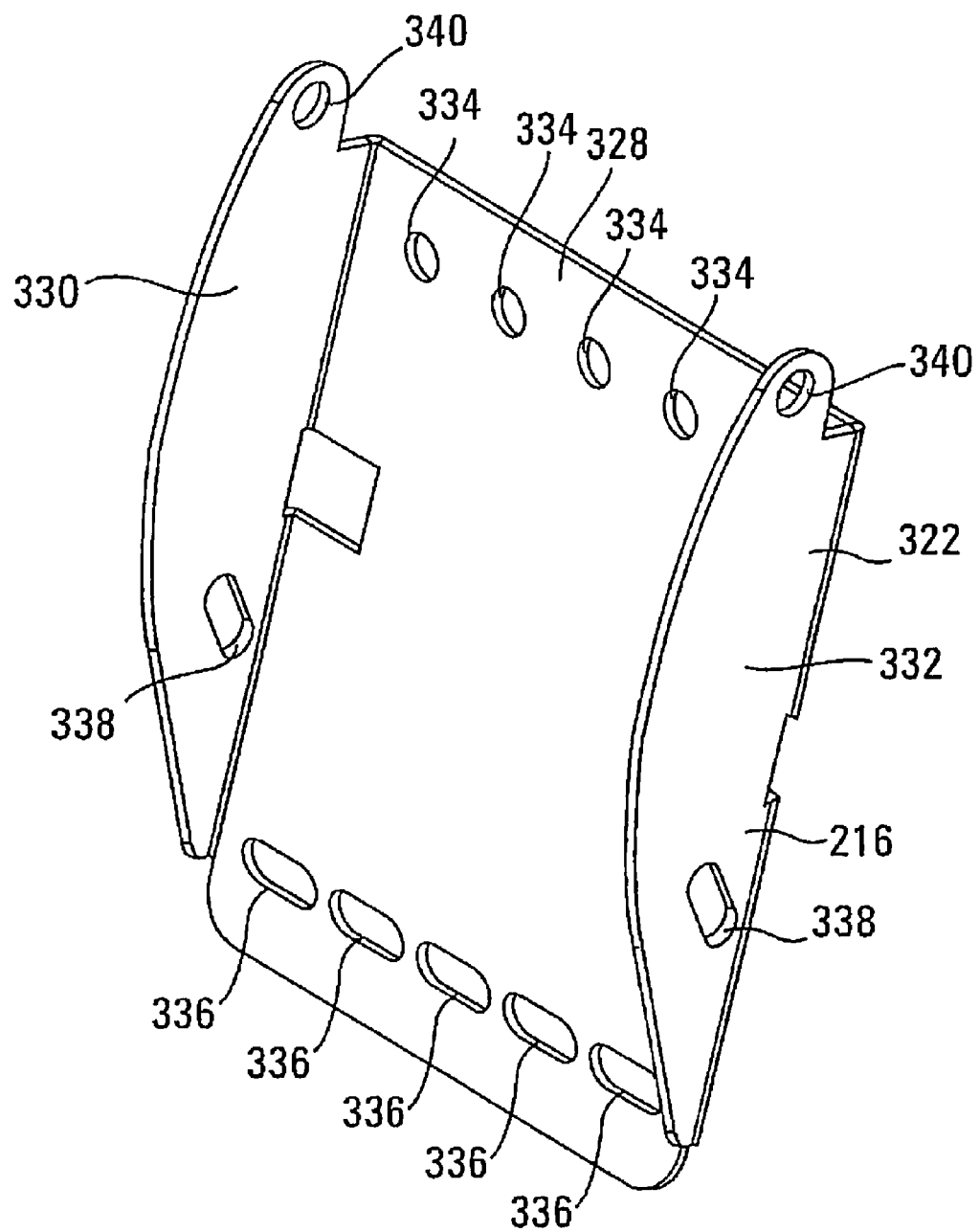
FIG. 35 is a perspective view of the interface plate component of a mount according to an embodiment of the invention.
Figure 36:
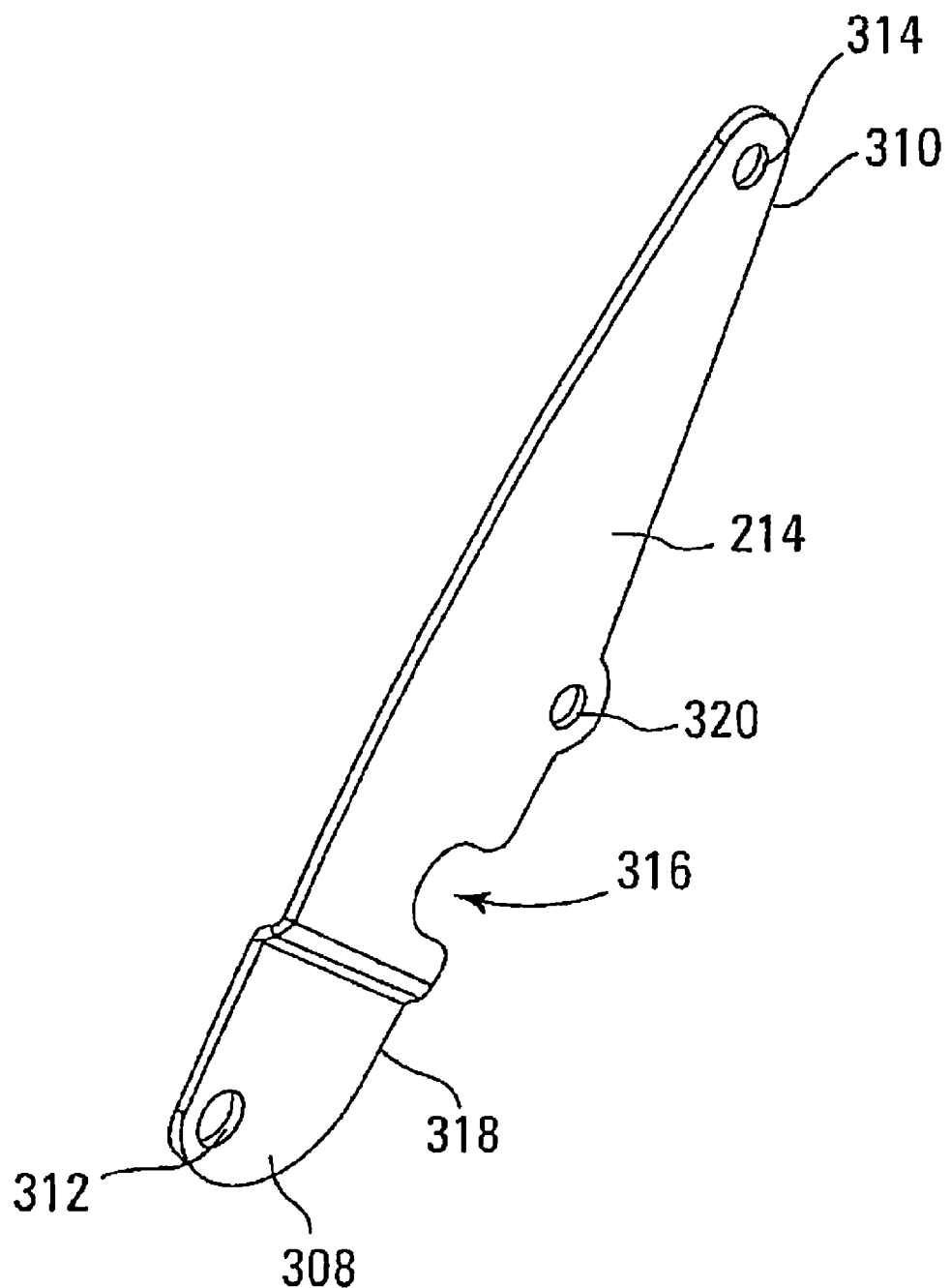
FIG. 36 is a perspective view of the outer pitch arm component of a mount according to an embodiment of the invention.
Figure 37:
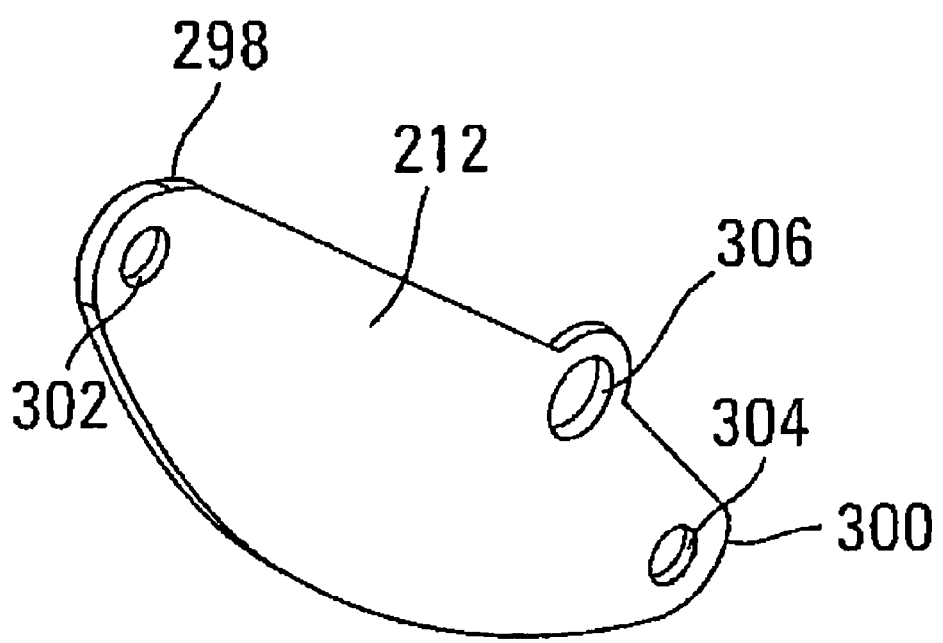
FIG. 37 is a perspective view of the inner pitch arm component of a mount according to an embodiment of the invention.
Figure 38:
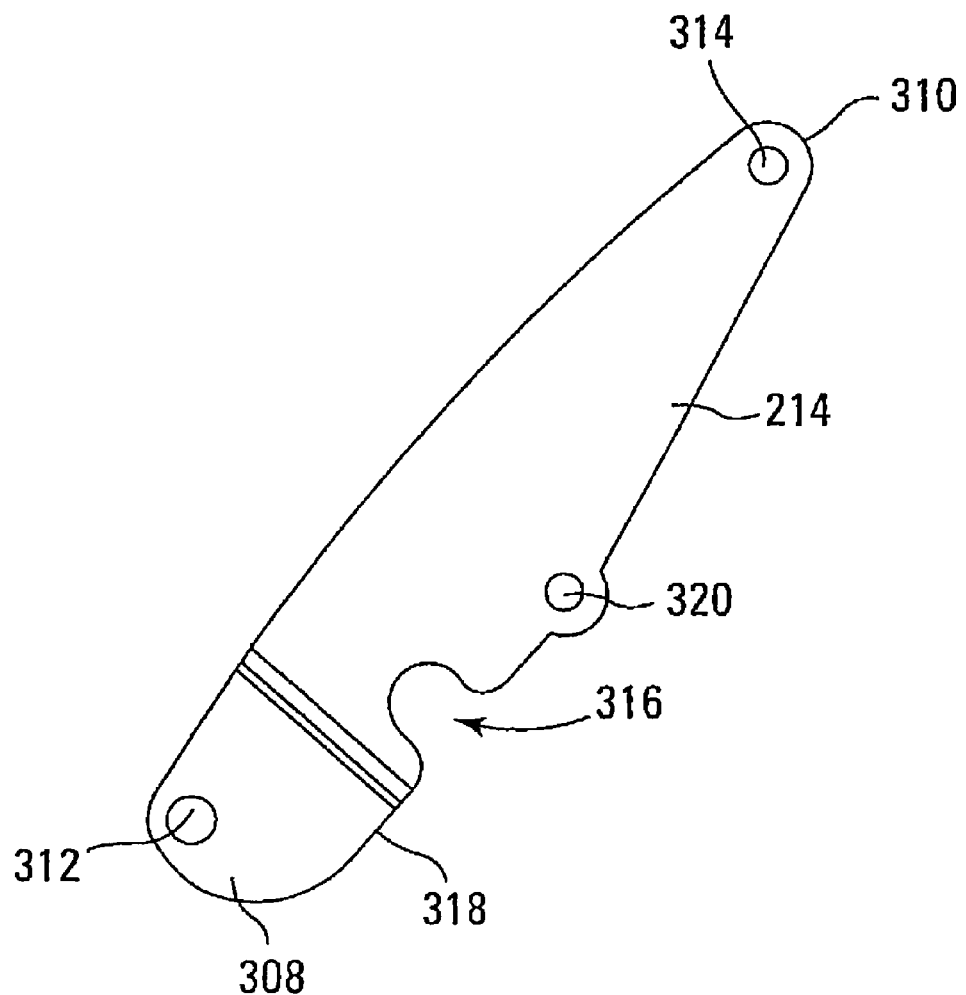
FIG. 38 is a side elevation view of the outer pitch arm component of a mount according to an embodiment of the invention.
Figure 39:
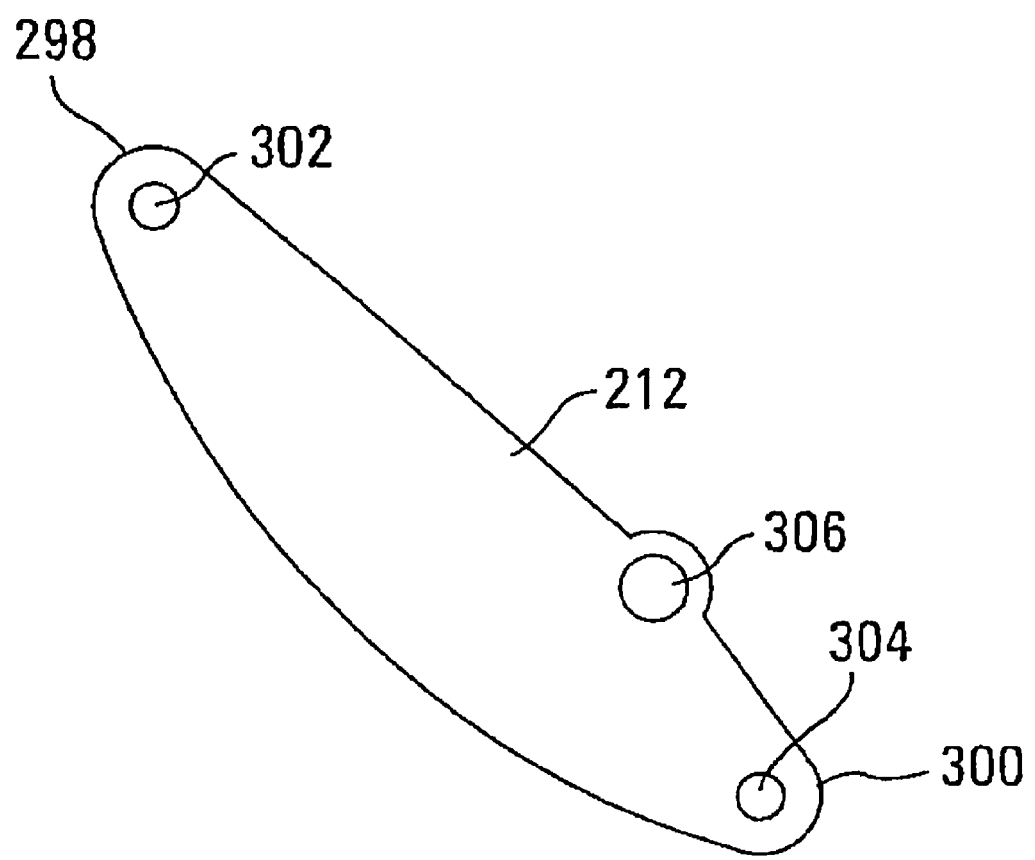
FIG. 39 is a side elevation view of the inner pitch arm component of a mount according to an embodiment of the invention.

In the embodiment depicted in FIGS. 30-31, mount 100 additionally includes friction element 356, which may include a bolt 358 extending through an aperture defined in inner pitch arm 212 and guide slot 360 defined in outer pitch arm 214. Friction washer 362 abuts outer surface 364 of outer pitch arm 214 and is held in place with nut 366. Notch 368 is defined in each of parallel flanges 330, 332 to clear friction element 356.

In use, friction can be selectively added if needed to maintain a desired tilt position by tightening nut 366. Conversely, friction can be removed to enable freer positioning of mount 100 by loosening nut 366.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A device for mounting an electronic display, comprising:
   a tilt head assembly for rotatably positioning the electronic display about a substantially horizontal tilt axis such that a center of gravity of the electronic display translates along a generally horizontal axis as the electronic display is rotated about the substantially horizontal tilt axis, and wherein the substantially horizontal tilt axis is disposed forward of and below a center of gravity of the electronic display.

2. The device of claim 1, wherein the tilt head assembly is operably connected to a display interface structure mountable to the electronic display.

3. The device of claim 2, wherein the tilt head assembly comprises an attachment member that is operably connected to the display interface structure.

4. The device of claim 1, the electronic display comprising a top edge and a bottom edge, wherein the top edge of the electronic display is capable of being pulled away from a wall structure to which the device is mounted to tilt the top edge away from the wall structure to a desired tilt position, whereby the bottom edge maintains substantially the same distance from the wall surface when the top edge is tilted to the desired tilt position.

5. The device of claim 4, wherein the electronic display is substantially self-balancing at any point along the generally horizontal axis.

6. The device of claim 4, wherein the desired tilt position is capable of being held without a secondary friction source.

7. The device of claim 4, wherein the top edge is rotatable through at least approximately thirty degrees.

8. A device for mounting an electronic display to a substantially vertical wall structure, the electronic display comprising a top edge and a bottom edge, the device comprising:
a tilt head assembly for selectively tilting the electronic display about a substantially horizontal tilt axis such that a center of gravity of the electronic display translates along a generally horizontal axis as the electronic display is rotated about the substantially horizontal tilt axis, and wherein the substantially horizontal tilt axis is disposed forward of and below a lower end of the electronic display.

9. The device of claim 8, wherein the tilt head assembly is operably connected to a display interface structure mountable to the electronic display.

10. The device of claim 9, wherein the tilt head assembly comprises an attachment member that is operably connected to the display interface structure.

11. The device of claim 8, wherein the top edge of the electronic display is capable of being pulled away from the wall to tilt the top edge away from the wall structure to a desired tilt position while the bottom edge maintains substantially the same distance from the wall surface when the top edge is tilted to the desired tilt position.

12. The device of claim 11, wherein the electronic display is substantially self-balancing at any point along the generally horizontal axis.

13. The device of claim 11, wherein the desired tilt position is capable of being held without a secondary friction source.

14. The device of claim 4, wherein the top edge is tiltable about the substantially horizontal tilt axis through at least approximately thirty degrees.

15. A device for mounting an electronic display to a substantially vertical wall structure, the electronic display comprising a substantially horizontal top end and a substantially horizontal bottom end separated by an intermediate region, the device comprising:
a tilt head assembly for selectively tilting the electronic display about a substantially horizontal tilt axis such that at least a portion of the intermediate region translates along a generally horizontal axis as the top end of the electronic display is rotated away from the wall to tilt the top end away from the wall structure to a desired tilt position, and wherein the bottom end maintaining substantially the same distance from the wall surface as the top end is tilted about the substantially horizontal tilt axis to the desired tilt position.

16. The device of claim 15, wherein the substantially horizontal tilt axis is disposed forward of and below the bottom end of the electronic display.

17. The device of claim 15, wherein the top end is tiltable about the substantially horizontal tilt axis through at least approximately thirty degrees.

18. The device of claim 15, wherein the bottom end does not contact the substantially vertical wall structure at any point of the top end being tilted about the substantially horizontal tilt axis.

19. The device of claim 15, wherein the at least a portion of the intermediate region of the electronic display is a center of gravity of the electronic display.

20. The device of claim 15, wherein the tilt head assembly is operably connected to a display interface structure mountable to the electronic display.

* * * * *